(12) United States Patent
Blais et al.

(10) Patent No.: US 6,930,320 B2
(45) Date of Patent: *Aug. 16, 2005

(54) RESONANT CONTROLLED QUBIT SYSTEM

(75) Inventors: Alexandre Blais, New Haven, CT (US); Jeremy P. Hilton, Vancouver (CA); Alexandre M. Zagoskin, Vancouver (CA)

(73) Assignee: D-Wave Systems, Inc., Vancouver (CA)

(*) Notice: Subject to any disclaimer, the term of this patent is extended or adjusted under 35 U.S.C. 154(b) by 0 days.

This patent is subject to a terminal disclaimer.

(21) Appl. No.: 10/798,737

(22) Filed: Mar. 10, 2004

(65) Prior Publication Data

US 2005/0101489 A1 May 12, 2005

Related U.S. Application Data

(63) Continuation of application No. 10/419,024, filed on Apr. 17, 2003.
(60) Provisional application No. 60/395,704, filed on Jul. 12, 2002, provisional application No. 60/385,123, filed on May 31, 2002, and provisional application No. 60/374,261, filed on Apr. 20, 2002.

(51) Int. Cl.[7] .................... H01L 29/06; H01L 31/0328; H03K 19/195
(52) U.S. Cl. ................ 257/31; 257/14; 326/3
(58) Field of Search ............ 505/193; 257/33, 257/31, 14; 326/3

(56) References Cited

U.S. PATENT DOCUMENTS

| | | |
|---|---|---|
| 5,917,322 A | 6/1999 | Gershenfeld et al. |
| 6,128,764 A | 10/2000 | Gottesman |
| 6,317,766 B1 | 11/2001 | Grover |
| 6,459,097 B1 | 10/2002 | Zagoskin |
| 6,504,172 B2 | 1/2003 | Zagoskin et al. |
| 6,563,311 B2 | 5/2003 | Zagoskin |
| 6,605,822 B1 | 8/2003 | Blais et al. |
| 6,614,047 B2 | 9/2003 | Tzalenchuk et al. |
| 6,670,630 B2 * | 12/2003 | Blais et al. .................... 257/33 |
| 2002/0188578 A1 | 12/2002 | Amin et al. |
| 2003/0193097 A1 | 10/2003 | Il'ichev et al. |
| 2003/0224944 A1 | 12/2003 | Il'ichev et al. |
| 2004/0012407 A1 * | 1/2004 | Amin et al. .................... 326/3 |
| 2004/0016918 A1 | 1/2004 | Amin et al. |

OTHER PUBLICATIONS

Bocko, M., "Prospects for Quantum Coherent Computation Using Superconducting Electronics", IEEE Transactions on Applied Superconductivity, vol. 7, No. 2, Jun. 1997, pp. 3638–3641.*

Ettinger, K. et al., "An Integrated 20 GHz SiGe Bipolar Differential Oscillator with High Tuning Range", Proceedings of the 2000 Bipolar/BiCMOS Circuits and Technology Meeting (Cat. No. 00CH37124) IEEE Piscataway, NJ, USA, Sep. 24, 2000, pp. 161–163, ISBN 0–7803–6384–1.*

(Continued)

Primary Examiner—Steven Loke
(74) Attorney, Agent, or Firm—Jones Day; Brett Lovejoy

(57) ABSTRACT

A method is provided for entangling a quantum state of a qubit with a quantum state of a resonant control system. The method comprises tuning the resonant control system, which is capacitively or inductively coupled to the qubit, to a resonant frequency for a period of time. The resonant frequency corresponds to an energy difference between a first energy level of the qubit and a second energy level of the qubit. The act of tuning entangles the quantum state of the qubit with the quantum state of the resonant control system. A representative resonant control system includes a Josephson junction. A method is also provided for entangling a quantum state of a qubit, within a plurality of qubits, with a quantum state of a resonant control system.

16 Claims, 8 Drawing Sheets

OTHER PUBLICATIONS

Makhlin, Y. et al., "Nano–electronic circuits as quantum bits", ISCAS 2000, IEEE International Symposium on Circuits and Systems, Geneva, vol. 2., May 28, 2000, pp. 241–244.*

J. Martinis, S. Nam, J. Aumentado, and C. Urbina, "Rabi Oscillations in a Large Josephson–Junction Qubit", Physical Review Letters, 89, pp. 117901–117904 (2002).

J.E. Mooij, T.P. Orlando, L. Levitov, L. Tian, C.H. van der Wal, and S. Lloyd, "Josephson persistent–current qubit," Science 285, pp. 1036–1039 (1999).

Y. Nakamura, Yu.A. Pashkin, and J.S. Tsai, "Coherent control of macroscopic quantum states in a single–Cooper–pair box", Nature, 398, pp. 786–788 (1999).

T.P. Orlando, J.E. Mooij, L. Tian, C.H. van der Wal, L.S. Levitov, S. Lloyd, and J.J. Mazo, "Superconducting persistent–current qubit", Physical Review B, 60, pp. 15398–15413 (1999).

F. Plastina and G. Falci, "Communicating Josephson qubits", arXiv.org:cond–mat/0206586 (2002).

P. Shor, "Polynomial–Time Algorithms for Prime Factorization and Discrete Logarithms on a Quantum Computer," SIAM Journal of Computing 26, pp. 1484–1499 (1997).

D. Vion, A. Aassime, A. Cottet, P. Joyez, H. Pothier, C. Urbina, D. Esteve, and M.H. Devoret, "Manipulating the quantum state of an electrical circuit", Science, 296, pp. 886–889 (2002).

C.H. van der Wal, A.C.J. ter Haar, F.K. Wilhelm, R.N. Schouten, C.J.P.M. Harmans, T.P. Orlando, S. Lloyd, and J.E. Mooij, "Quantum superposition of macroscopic persistent–current states", Science, 290, pp. 773–777 (2000).

Y. Yu, S. Han, X. Chu, S.–I. Chu, and Z. Wang, "Coherent temporal oscillations of macroscopic quantum states in a Josephson junction", Science, 296, pp. 889–892 (2002).

W.H. Zurek, "Decoherence and the transition from quantum to classical", Physics Today, 44, 10, pp. 36–44 (1991).

Ulrich Weiss, *Quantum Dissipative Systems*, $2^{nd}$ edition, World Scientific Publishing Co. Pte. Ltd., front page, copyright page, pp. 164–174, 240–251, and 274–380 (1999).

S. L. Braunstein and H.–K. Lo, eds., *Scalable Quantum Computers*, Wiley–VCH, front page, copyright page and pp. 1–13 (2001).

DiVincenzo, D.P., 2000, "The Physical Implementation of Quantum Computation", Fortschritte der Physik 48, pp. 771–783, also published in Braunstein, S. L., and H.–K. Lo (eds.), 2000, *Scalable Quantum Computers*, Wiley–VCH, Berlin, ISBN 3–527–40321–3.

Poyatos, J.F., J.I. Cirac, and P. Zoller, 2000, "Schemes of Quantum Computations with Trapped Ions," Fortschritte der Physik 48, pp. 785–799, also published in Braunstein, S. L., and H.–K. Lo (eds.), 2000, *Scalable Quantum Computers*, Wiley–VCH, Berlin, ISBN 3–527–40321–3.

Grangier, P., G. Reymond, and N. Schlosser, 2000, "Implementations of Quantum Computing Using Cavity Quantum Electrodynamics," Fortschritte der Physik 48, pp. 859–874, also published in Braunstein, S. L., and H.–K. Lo (eds.), 2000, *Scalable Quantum Computers*, Wiley–VCH, Berlin, ISBN 3–527–40321–3.

Cory, D.G., et al., 2000, "NMR Based Quantum Information Processing: Achievements and Prospects," Fortschritte der Physik 48, pp. 875–907, also published in Braunstein, S. L., and H.–K. Lo (eds.), 2000, *Scalable Quantum Computers*, Wiley–VCH, Berlin, ISBN 3–527–40321–3.

Burkard, G., H.–A. Engel, and D. Loss, 2000, "Spintronics and Quantum Dots for Quantum Computing and Quantum Communication," Fortschritte der Physik 48, pp. 965–986, also published in Braunstein, S. L., and H.–K. Lo (eds.), 2000, *Scalable Quantum Computers*, Wiley–VCH, Berlin, ISBN 3–527–40321–3.

Kane, B.E., 2000, "Silicon–based Quantum Computation," Fortschritte der Physik 48, pp. 1023–1041, also published in Braunstein, S. L., and H.–K. Lo (eds.), 2000, *Scalable Quantum Computers*, Wiley–VCH, Berlin, ISBN 3–527–40321–3.

U.S. Appl. No. 10/801,335, Blais et al., filed Mar. 10, 2004.
U.S. Appl. No. 10/801,336, Blais et al., filed Mar. 15, 2004.
U.S. Appl. No. 10/801,340, Blais et al., filed Mar. 15, 2004.
U.S. Appl. No. 60/341,974, Il'ichev et al., filed Dec. 18, 2001.
U.S. Appl. No. 60/349,663, Amin et al., filed Jan. 15, 2002.
U.S. Appl. No. 60/372,958, Il'ichev et al., filed Apr. 15, 2002.
U.S. Appl. No. 60/556,778, Hilton et al., filed Mar. 26, 2004.
U.S. Appl. No. 60/557,747, Amin et al., filed Mar. 29, 2004.
U.S. Appl. No. 60/557,750, Grajcar et al., filed Mar. 29, 2004.

W.A. Al–Saidi and D. Stroud, "Eigenstates of a small Josephson junction coupled to a resonant cavity", Physical Review B, 65, pp. 014512–1 to 014512–7 (2001).

A.D. Armour, M.P. Blencowe, and K.C. Schwab, "Entanglement and Decoherence of a Micromechanical Resonator via Coupling to a Cooper–Pair Box", Physical Review Letters, 88, pp. 148304–1 to 148301–4 (2002).

A. Barenco, C.H. Bennet, R. Cleve, D.P. DiVincenzo, N. Margolus, P. Shor, T. Sleator, J.A. Smolin, and H. Weinfurter, "Elementary gates for quantum computation", Physical Review A 52, pp. 3457–3567 (1995).

A. Blais, "Quantum network optimization", Physical Review A, 64, pp. 022312–1 to 022312–5 (2001).

G. Blatter, V.B. Geshkenbein, and L. Ioffe, "Design aspects of superconducting–phase quantum bits," Physical Review B, 63, pp. 174511–1 to 174511–9 (2001).

D. Born, T. Wagner, W. Krech, U. Hubner, and L. Fritzsch, "Fabrication of ultrasmall tunnel junctions by electron beam direct–writing", IEEE Transactions on Applied Superconductivity, 11, pp. 373–376 (2001).

O. Buisson and F.W.J. Hekking, "Entangled states in a Josephson charge qubit coupled to a superconducting resonator", arXiv.org:cond–mat/0008275 (2000).

A. Cottet, D. Vion, A. Aassime, P. Joyez, D. Esteve, and M.H. Devoret, "Implementation of a combined charge–phase quantum bit in a superconducting circuit", Physica C, 367, pp. 197–203 (2002).

D. Deutsch, "Quantum theory, the Church–Turing principle and the universal quantum computer", Proceedings of the Royal Society of London A, 400, pp. 97–115 (1985).

D.P. DiVincenzo, "The physical implementation of quantum computation", arXiv.org:quant–ph/0002077 (2000).

Economist, "Quantum Dreams", pp. 1–3 (Mar. 8, 2001).

R.P. Feynman, "Simulating physics with computers", International Journal of Theoretical Physics, 21, pp. 467–488 (1982).

J.R. Friedman, V. Patel, W. Chen, S.K. Tolpygo, and J.E. Lukens, "Quantum superposition of distinct macroscopic states", Nature, 406, pp. 43–46 (2000).

L.K. Grover, "A fast quantum mechanical algorithm for database search", Proceedings of the 28th STOC, pp. 212–219 (1996).

S. Han, Y. Yu, X. Chu, S.–I. Chu, and Z. Wang, "Time-resolved measurement of dissipation–induced decoherence in a Josephson junction", Science, 293, pp. 1457–1459 (2001).

F.W.J. Hekking, O. Buisson, F. Balestro, and M.G. Vergniory, "Cooper Pair Box Coupled To a Current–Biased Josephson Junction", arXiv.org:cond–mat/0201284 (2002).

X. Hu, R. de Sousa, and S. Das Sarma, "Decoherence and dephasing in spin–based solid state quantum computers", arXiv.org:cond–mat/0108339 (2001).

P. Joyez, P. Lafarge, A. Filipe, D. Esteve, and M.H. Devoret, "Observation of parity–induced suppression of Josephson tunneling in the superconducting single electron transistor", Physical Review Letters, 72, pp. 2458–2462 (1994).

A.J. Leggett, S. Chakravarty, A.T. Dorsey, M.P.A. Fisher, A. Garg, W. Zwerger, "Dynamics of the dissipative two–state system", Reviews of Modern Physics, 59, pp. 1–85 (1987).

Yu, Makhlin, G. Schön, and A. Shnirman, "Quantum–state engineering with Josephson–junction devices", Reviews of Modern Physics, 73, pp. 357–400 (2001).

F. Marquardt and C. Bruder, "Superposition of two mesoscopically distinct quantum states: Coupling a Cooper–pair box to a large superconducting island", Physical Review B, 63, pp. 054514–054520 (2001).

Makhlin, Y., G. Schoen, and A. Shnirman, 2000, "Josephson–Junction Qubits," Fortschritte der Physik 48, pp. 1043–1054, also published in Braunstein, S. L., and H.–K. Lo (eds.), 2000, *Scalable Quantum Computers*, Wiley–VCH, Berlin, ISBN 3–527–40321–3.

Averin, D.V., 2000, "Quantum Computing and Quantum Measurements with Mesoscopic Josephson Junctions," Fortschritte der Physik 48, pp. 1055–1074, also published in Braunstein, S. L., and H.–K. Lo (eds.), 2000, *Scalable Quantum Computers*, Wiley–VCH, Berlin, ISBN 3–527–40321–3.

Spiller, T.P., 2000, "Superconducting Circuits for Quantum Computing," Fortschritte der Physik 48, pp. 1075–1094, also published in Braunstein, S. L., and H.–K. Lo (eds.), 2000, *Scalable Quantum Computers*, Wiley–VCH, Berlin, ISBN 3–527–40321–3.

Dykman, M.I., and P.M. Platzman, 2000, "Quantum Computing Using Electrons Floating on Liquid Helium," Fortschritte der Physik 48, pp. 1095–1108, also published in Braunstein, S. L., and H.–K. Lo (eds.), 2000, *Scalable Quantum Computers*, Wiley–VCH, Berlin, ISBN 3–527–40321–3.

* cited by examiner

RESONANT CONTROLLED QUBIT SYSTEM

This application is a continuation of U.S. patent application Ser. No. 10/419,024 filed Apr. 17, 2003, which claims priority to U.S. Patent Application Ser. No. 60/374,261 filed Apr. 20, 2002; U.S. Patent Application Ser. No. 60/385,123 filed May 31, 2002; and U.S. Patent Application Ser. No. 60/395,704 filed Jul. 12, 2002, each of which is hereby incorporated by reference in its entirety.

CROSS-REFERENCE TO RELATED APPLICATIONS

This application is related to the following applications: U.S. application Ser. No. 09/452,749 entitled "Permanent Readout Superconducting Qubit" filed Dec. 1, 1999; U.S. application Ser. No. 09/872,495 entitled "Quantum Processing System And Method For A Superconducting Phase Qubit" filed Jun. 1, 2001; U.S. application Ser. No. 10/025,848 entitled "Finger Squid Qubit Device" filed Dec. 17, 2001; U.S. Application Ser. No. 60/341,794, entitled "Characterization And Measurement of Superconducting Structures" filed Dec. 18, 2001; U.S. Application Ser. No. 60/349,663, entitled "Two Junction Phase Qubit" filed Jan. 15, 2002; U.S. Application Ser. No. 60/383,597 entitled "Resonant Controlled Qubit System" filed Apr. 20, 2002, each of which is incorporated herein by reference in their entirety.

FIELD OF THE INVENTION

The present invention relates to quantum computing. More specifically, the present invention relates to entangling the quantum state of superconducting qubits.

BACKGROUND

In 1982 Richard Feynman introduced the concept of a "quantum simulator." See Feynman, 1982, "Simulating Physics with Computers", *Int. J. Theor. Phys.* 21, p. 467, which is hereby incorporated by reference in its entirety. Soon thereafter it was determined that a quantum system could be used to yield a potentially exponential time saving in certain types of intensive computations. See Deutsch, 1985, "Quantum Theory, the Church-Turing Principle and the Universal Quantum Computer", *Proc. of the Roy. Soc. of London* A400, p. 97, which is hereby incorporated by reference in its entirety. Since then, further quantum computing research has provided significant software and hardware advances. As the speed of classical computers approaches a projected upper bound due to the natural limits of miniaturization of integrated circuits, the interest in quantum computers has intensified. Indeed many algorithms suitable for quantum computing have been written. Two notable examples of such algorithms are the Shor and Grover algorithms. See Shor, 1997, *SIAM J. of Comput.* 26, p. 1484; U.S. Pat. No. 6,317,766; and Grover, 1996, *Proc. 28th STOC* p. 212, which are hereby incorporated by reference in their entireties. Nevertheless, sizeable obstacles prevent the development of large-scale quantum computing devices that are practical and that are capable of outperforming known classical computers. See, for example, "Quantum Dreams", *The Economist*, Mar. 10, 2001, pp. 81–82, which is hereby incorporated by reference in its entirety.

In fact, the field of quantum computing remained theoretical until the late 1990's when several hardware proposals were tested. Of these hardware proposals, the most scalable physical systems appear to be those that are superconducting structures. Superconducting material is material that has zero electrical resistance below critical levels of current, magnetic field and temperature. Josephson junctions are examples of such structures. In fact, Josephson junctions are of special interest because their observable properties are macroscopic manifestations of underlying quantum mechanical principles.

One physical realization of a quantum computer is based on quantum bits, or "qubits." Generally speaking, a qubit is a well-defined physical structure that (i) has a plurality of quantum states, (ii) can be isolated from its environment and (iii) quantum tunneling between each of the quantum states can occur. See for example, Mooji et al., 1999, Science 285, p. 1036. A survey of the current physical systems from which qubits can be formed is found in Braunstein and Lo (eds.), 2001, *Scalable Quantum Computers*, Wiley-VCH Verlag GmbH, Berlin, which is hereby incorporated by reference in its entirety.

In order for a physical system to behave as a qubit a number of requirements must be satisfied. See DiVincenzo in *Scalable Quantum Computers*, chapter 1, Wiley-VCH Verlag GmbH, Berlin which is hereby incorporated by reference in its entirety. These requirements include the need for the physical system (qubit) to be scalable. In other words, it must be possible to combine a reasonable number of the qubits in a coherent fashion. Associated with scalability is the need to eliminate qubit decoherence. Also required for a qubit to be useful in quantum computing, is the ability to perform operations that initialize, control and couple the qubit. Control of a qubit includes performing single qubit operations as well as operations on two or more qubits. In order to support universal quantum computing, this set of operations needs to be a universal set. A universal set of quantum operations is any set of quantum operations that permits all possible quantum computations. Many sets of gates are universal, see Barenco et al., 1995, *Physical Review A* 52, p. 3457, which is hereby incorporated by reference in its entirety. Yet another requirement is the need to be able to measure the state of the qubit in order to perform computing operations and retrieve information.

There are two principal means to realize superconducting qubits. One means corresponds to the limits of well-defined charge (charge qubit). The other means corresponds to the limits of well-defined phase (phase qubit). Phase and charge are related variables that, according to basic quantum principles, are canonical conjugates of one another. The division of the two classes of devices is outlined in Makhlin et al., 2001, *Reviews of Modern Physics* 73, p. 357, which is hereby incorporated by reference in its entirety.

Materials that exhibit superconducting properties are attractive candidates for quantum computing applications, since the quantum behavior of the Bose condensates (Cooper pairs) at Josephson junctions have macroscopically observable consequences. Indeed, recently, several designs of a superconducting qubit have been proposed and tested. See, for example, Nakamura et al., 1999, *Nature* 398, p. 786; Friedman et al, 2000, *Nature* 406, p. 43; and van der Wal et al., 2000, Science 290, p. 773, which are hereby incorporated by reference in their entireties. The qubits described in these reference demonstrate the existence of qubits having potential energy states. The qubits described in these reference are not coupled and they are not controlled in a scalable manner. Therefore, the qubits described in these references do not satisfy all the requirements for universal quantum computing put forth by DiVincenzo.

The preferred type of superconducting material used to make a qubit depends on the nature of the qubit. Generally speaking, these materials are often divided into metal and oxides. However, the ability to deposit metals and oxides (that are not oxides of the deposited metal) on the same chip is expensive and time consuming. This is a concern because this form of deposition is needed in many types of qubit. Thus, known fabrication methods for forming many types of qubits is time consuming, expensive and difficult.

The quantum mechanical properties of a qubit are easily affected by interactions between the qubit and the environment (e.g., other systems). Yet quantum computing requires that the qubit be isolated from such interactions so that the state of the qubit can coherently evolve in accordance with a quantum gate that is applied to the qubit. Despite the requirement for isolation so that the qubit can evolve, universal quantum computing still requires some control over (interaction with) the qubit so that fundamental operations such as qubit initialization, gate application, and qubit state measurement can be effected. This apparent contradiction between the need for isolation and the need for control over the qubit is a direct result of the quantum behavior of qubits.

The need for isolated qubits that nevertheless can be controlled has presented numerous fabrication and design challenges. Such challenges have included identification of methods for initialization, control, coupling and measurement of qubits. Systems and methods for addressing these challenges are being investigated. In particular, systems in which qubits can be controlled and measured in ways that do not perturb their internal quantum states are being sought. Devices that include multiple controllable qubits that permit classical logic operations to be performed are central to the goal of building a quantum computer. To date, many known systems and methods for coupling model qubits in simulated quantum computing devices have been unwieldy and generally unsatisfactory. Such systems and methods are based on optics (entanglement of photons) or nuclear magnetic resonance (utilizing spin states of atoms and molecules).

Recently, however, inductive coupling between phase qubits has been described. See, for example, Orlando et al., 1999, "Superconducting Persistent Current Qubit", *Phys. Rev. B* 60, p. 15398, and Makhlin et al., 2001, "Quantum-State Engineering with Josephson-Junction Devices", *Reviews of Modern Physics* 73, p. 357 (and in particular, page 369), each of which is incorporated herein by reference in their entireties. However, the qubits described in Orlando et al. have not been coupled and controlled in a scalable manner.

As discussed above, in order to effect quantum computing, a physical system containing a collection of qubits is needed. A qubit as defined herein is a quantum two-level system that is like the ground and excited states of an atom. The generic notation of a qubit state denotes one state as |0> and the other as |1>. The essential feature that distinguishes a qubit from a bit is that, according to the laws of quantum mechanics, the permitted states of a single qubit fills up a two-dimensional complex vector space; the general notation is written a|0>+b|1>, where a and b are complex numbers. The general state of two qubits, a|00>+b|01>+c|10>+d|11> is a four-dimensional state vector, one dimension for each distinguishable state of the two qubits. When an entanglement operation has been performed between the two qubits, their states are entangled. This means that they cannot be written as a product of the states of two individual qubits. The general state of n entangled qubits is therefore specified by a $2^n$-dimensional complex state vector. The creation of $2^n$-dimensional complex vectors provides one of the bases for the enormous computing potential of quantum computers. For more information on qubits and entanglement, see Braunstein and Lo (eds), 2001, *Scalable Quantum Computers*, Wiley-VCH, New York, which is incorporated herein by reference in its entirety.

Current methods for entangling qubits in order to realize $2^n$-dimensional complex state vectors are susceptible to loss of coherence. Loss of coherence is the loss of the phases of quantum superpositions in a qubit as a result of interactions with the environment. Loss of coherence results in the loss of the superposition of states in a qubit. See, for example, Zurek, 1991, Phys. Today 44, p. 36; Leggett et al., 1987, Rev. Mod. Phys. 59, p. 1; Weiss, 1999, Quantitative Dissipative Systems, $2^{nd}$ ed., World Scientific, Singapore; and Hu et al; arXiv:cond-mat/0108339, which are hereby incorporated by reference in their entireties.

It has been proposed in the art that a superconducting resonator can be entangled with a qubit when the resonant frequency of the superconducting resonator is correlated with the energy difference between the basis states of the qubit. See, e.g., Buisson and Hekking, Aug. 18, 2000, "Entangled states in a Josephson charge qubit coupled to a superconducting resonator," LANL cond-mat/0008275 and the references therein, and Al-Saidi and Stroud, Dec. 4, 2001 "Eigenstates of a small Josephson junction coupled to a resonant cavity", Phys. Rev. B, 65, 014512 and the references therein, which are hereby incorporated by reference in their entireties. The entanglement proposed in these references causes the state of the charge qubit to be entangled with the state of the superconducting resonator, thus illustrating the potential for achieving entangled quantum states in a solid state design. However, the references do not provide methods for coherently entangling the quantum states of qubits in a solid-state design, nor do they demonstrate how such entanglement is useful for quantum computing.

The Josephson junction qubit has been proposed in the art. See, e.g. Martinis et al, "Rabi oscillations in a large Josephson junction qubit", preprint presented at the American Physical Society (APS) 2002 Annual Meeting, held Jul. 27–31, 2002, and Han et al., 2001, Science, 293, 1457, which are hereby incorporated by reference in their entireties. In order to perform quantum computation, the basis states |0> and |1> of the Josephson junction qubit are allowed to evolve according to the rules of quantum mechanics. This quantum evolution is extremely sensitive to decoherence arising from various sources, such as thermal excitations or stray fields. Therefore, qubits must remain coherent in order to achieve scalable quantum computation. Previously, mechanisms proposed for controlling quantum evolution required microwave frequency current biasing of the already current biased Josephson junction qubit.

A problem that is therefore present in the art is the question of how to entangle qubits in order to realize a quantum register that can support quantum computing. In the art, some types of qubits are set to an initial state using means such as a dc current. Next, the qubits are permitted to tunnel between a base and first energy level quantum state.

The tunneling, also termed evolution, is a necessary aspect of quantum computing. One means for allowing qubits to evolve is to apply an AC current. The problem, however, is that qubits that are permitted to tunnel between a base and first energy level quantum state using an AC current cannot easily be entangled with other qubits in order to achieve a $2^n$-dimensional complex state vector, where n is the number of qubits in the quantum register. Such entanglement is necessary in order to realize a quantum register that can support quantum computing. Given the above background, it is apparent that improved methods for permitting qubits to tunnel between a base and first energy level quantum state are needed in the art.

BRIEF DESCRIPTION OF THE DRAWINGS

Like reference numerals refer to corresponding parts throughout the several views of the drawings.

SUMMARY OF THE INVENTION

Figure 1:
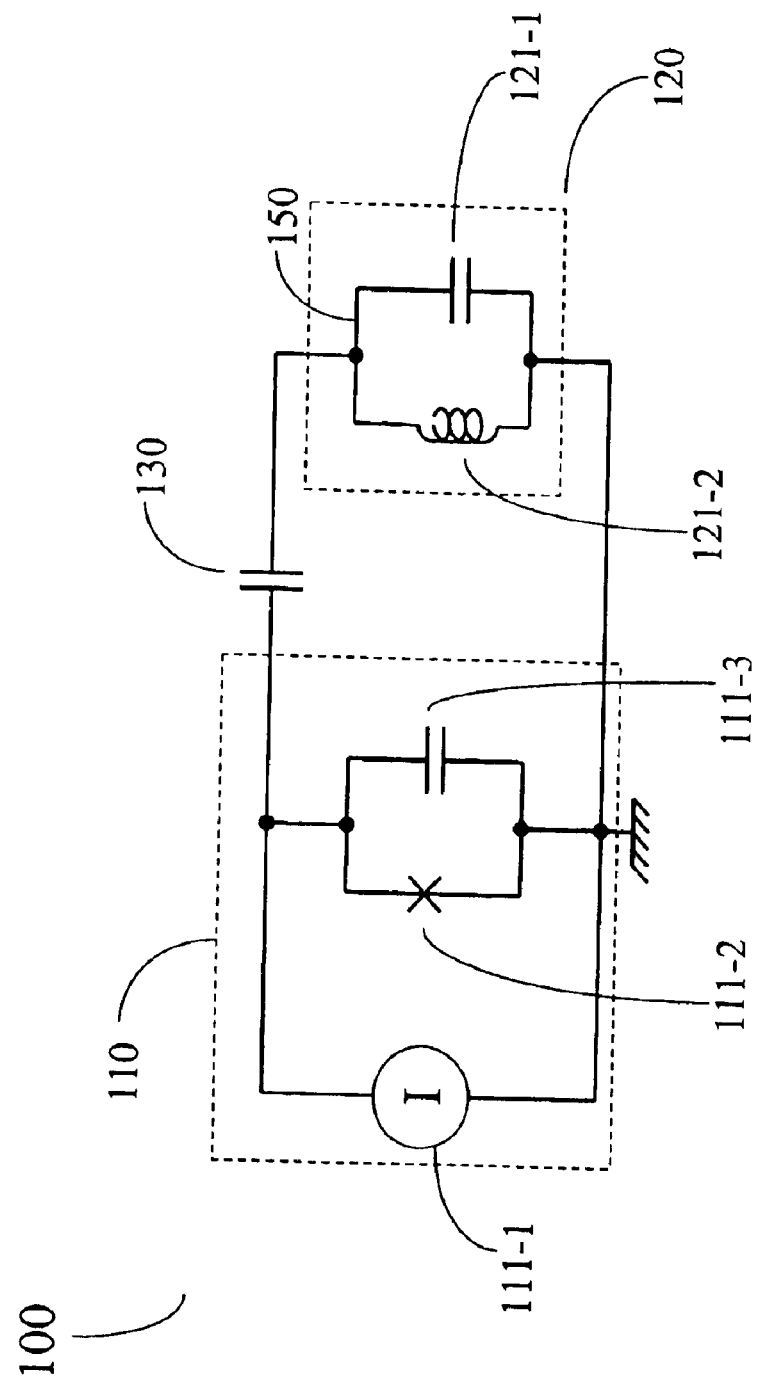
FIG. 1 illustrates a Josephson junction qubit and a resonant circuit in a system in accordance with one embodiment of the present invention.

The present invention provides apparatuses and methods for allowing qubits to evolve. A major advantage of the present invention is that the apparatuses and methods of the present invention can be used to entangle qubits in order to realize the quantum gates and registers that are necessary for quantum computing. In the invention, two or more superconducting qubits are coherently connected to a tunable circuit. In an illustrative case, there are two qubits that can be coherently coupled to the tunable circuit. Each of the two qubits is characterized by a qubit frequency. First, the tunable circuit is adjusted so that the resonant frequency of the circuit matches the qubit frequency of the first of the two qubits. The resonant frequency of the circuit matches the qubit frequency of the first of the two qubits when the resonant frequency is the same as the qubit frequency or is an integer multiple of the qubit frequency. When this is the case, the quantum state of the first superconducting qubit can evolve. Furthermore, the quantum state of the first qubit influences the quantum state of the tunable circuit. Next, the tunable circuit is adjusted so that the resonant frequency of the tunable circuit matches the qubit frequency of the second of the two circuits. When this is the case, the quantum state of the second qubit can evolve. Furthermore, the quantum state of the second superconducting qubit influences the quantum state of the tunable circuit. In this way, the quantum state of the first and second qubits becomes entangled. A further step of matching the resonant frequency of the circuit to the first of the two qubits, hence entangling the first of the two qubits and the circuit for a second time, reverses the entanglement of the circuit with each of the qubits. This essentially acts to reset the circuit. In this way, the circuit can be used for subsequent entanglement operations.

One embodiment of the present invention provides a resonant control system. The resonant control system includes a superconducting qubit that is characterized by a qubit frequency between about 0.8 Giga-Hertz (GHz) and about 40 GHz. Furthermore, the control system includes a circuit that is characterized by a resonant frequency. The resonant frequency is a function of an effective capacitance of the circuit and an effective inductance of the circuit. At least one of the effective capacitance and the effective inductance is adjustable so that the resonant frequency of the circuit can be tuned to a predetermined resonant frequency. The resonant control system further includes a superconducting mechanism having a capacitance. The superconducting mechanism coherently couples the superconducting qubit to the circuit. In some embodiments, the superconducting qubit is a Josephson junction qubit. In such embodiments, a current source is provided to bias the Josephson junction, thereby creating a three-energy level energy potential well for the superconducting qubit. In some embodiments, the circuit is superconducting.

Another embodiment of the present invention provides a resonant control system that includes a plurality of superconducting qubits. Each superconducting qubit in the plurality of superconducting qubits is independently characterized by a frequency between about 0.8 GHz and about 40 GHz. The resonant control system further includes a circuit that is characterized by a resonant frequency. The resonant frequency is a function of an effective capacitance of the circuit and an effective inductance of the circuit. At least one of the effective capacitance and the effective inductance is adjustable so that the resonant frequency of the circuit can be tuned to a predetermined resonant frequency. Further, the resonant control system includes a mechanism for coupling at least one of the plurality of superconducting qubits to the circuit.

Still another embodiment of the present invention provides a method for controlling a qubit. In the method, a superconducting qubit that is characterized by a qubit frequency is provided. Then, for some duration $t_1$, at least one of an effective capacitance and an effective inductance of a circuit, which is capacitively coupled to the superconducting qubit, is adjusted so that the resonant frequency of the circuit is set to an active frequency that allows the circuit to interact with the qubit in a manner that permits quantum evolution of the state of the superconducting qubit. In some embodiments, the superconducting qubit is a Josephson junction qubit, and the method further comprises providing a current source to bias the Josephson junction qubit thereby creating a three-energy level energy potential well for the superconducting qubit. In some embodiments, the circuit is superconducting. In some embodiments, the resonant frequency of the circuit $\omega$ is:

$$\frac{1}{\sqrt{LC}}$$

where,
L is the effective inductance of the circuit, and
C is the effective capacitance of the circuit.

Another embodiment of the present invention provides a method for controlling a qubit. The method comprises providing a superconducting qubit that is characterized by a critical frequency correlated with the energy difference between the basis states of the qubit. In the method a tunable resonant circuit is controllably coupled to the qubit for some duration $t_1$. The tunable resonant circuit has a resonant frequency that correlates with the critical frequency of the superconducting qubit, Yet another embodiment of the present invention provides a method for entangling the quantum state of superconducting qubits. In the method, a plurality of superconducting qubits is provided. Further, the resonant frequency of a resonant circuit is tuned to a frequency $f_1$, for a period of time $t_1$. Frequency $f_1$ is a frequency that allows the tunable resonant circuit to couple to a first superconducting qubit in a plurality of superconducting qubits. Next, the resonant circuit is coupled, during at least a portion of the period $t_1$, to the first superconducting qubit so that the quantum state of the first superconducting qubit influences the quantum state of the circuit. Then, the resonant frequency of the tunable resonant circuit is tuned to the frequency $f_2$ for a duration $t_2$. Frequency $f_2$ is a frequency that allows the tunable resonant circuit to couple to a second superconducting qubit in the plurality of superconducting qubits. The resonant circuit is coupled, during at least a portion of the period $t_2$, to the second superconducting qubit so that the quantum state of the first superconducting qubit influences the quantum state of the circuit, thereby entangling the state of a plurality of superconducting qubits.

In some embodiments of the invention, a method for entangling the quantum states of superconducting qubits further includes a final step of tuning the resonant frequency of the resonant circuit to a first frequency $f_1$, for a duration $t_3$. The result of this entanglement operation leaves the resonant circuit unentangled with respect to the corresponding qubits from the operation thereby affecting a square root of SWAP logical operation.

Another embodiment of the present invention provides a circuit comprising a superconducting qubit and a resonant control system that is characterized by a resonant frequency. The resonant frequency is a function of a bias current. The qubit is characterized by a qubit frequency between about 0.8 GHz and about 40 GHz. The circuit further includes a superconducting mechanism having a capacitance or inductance. The superconducting mechanism coherently couples the superconducting qubit to the resonant control system. Still another embodiment of the present invention provides a quantum register. The quantum register comprises (1) an array of superconducting qubits, (2) at least one resonant control system having a characteristic resonance frequency, and (3) a bus mechanism for capacitively or inductively coupling each superconducting qubit in the array of superconducting qubits to the at least one resonant control system.

Yet another embodiment of the present invention provides a method for controllably entangling a quantum state of a first qubit with the quantum state of a second qubit. The method comprises tuning a resonant control system, which is capacitively coupled to the first and second qubit, to a first frequency for a period of time $t_1$. The first frequency corresponds to the energy differential between the lowest two potential energy levels of the first qubit. Then, the resonant control system is adjusted to a second frequency for a time period $t_2$. The second frequency represents the energy differential between the lowest two potential energy levels of the second qubit.

Yet another embodiment of the present invention provides a method for entangling a qubit in a first qubit group with a second qubit in a second qubit group. The method comprises coupling, for a first period of time, the first qubit with a first resonant control system by biasing the first resonant control system to a first frequency, the first frequency representing the energy differential between the lowest two potential energy levels of the first qubit. Then, coupling, for a second period of time, the first resonant control system to a pivot qubit by biasing the resonant control system to a second frequency, the second frequency representing the energy differential between the lowest two potential energy levels of the pivot qubit. Next, a subregion that is capacitively connected to the pivot qubit is isolated from the first qubit group and the first resonant control system. A second resonant control system is coupled, for a third period of time, with the pivot qubit by biasing the second resonant control system to a third frequency, the third frequency representing the energy differential between the lowest two potential energy levels of the pivot qubit. The second resonant control system is capacitively or inductively coupled to the second qubit in the second qubit group. Next, the second qubit group and the second resonant control system are isolated from the pivot qubit. Finally, the method includes coupling, for a fourth period of time, the second resonant control system with the second qubit by biasing the second resonant control system to a fourth frequency, the fourth frequency representing the energy differential between the lowest two potential energy levels of the second qubit.

DETAILED DESCRIPTION

An embodiment of the present invention provides a method for entangling a quantum state of a qubit with a quantum state of a resonant control system. The method for entangling a quantum state comprises tuning a resonant control system, which is capacitively or inductively coupled to the first qubit, to a resonant frequency for a period of time. The resonant frequency corresponds to an energy difference between a first energy level and a second energy level of the qubit. The act of tuning entangles the quantum state of the qubit with the quantum state of the resonant control system.

An embodiment of the present invention provides a method for entangling a quantum state of a qubit with a quantum state of a resonant control system, including a Josephson junction. In such an embodiment, the resonant control system includes a Josephson junction with a bias current source that is connected in series with the Josephson junction. The act of tuning comprises altering the magnitude of the bias current source.

Another embodiment of the present invention provides a method for entangling a quantum state of a qubit, within a plurality of qubits, with a quantum state of a resonant control system. The method includes tuning a resonant control system, which is capacitively or inductively coupled to the qubit within the plurality of qubits, to a resonant frequency. The resonant frequency corresponds to an energy difference between a first energy level and a second energy level of the selected qubit within the plurality of qubits.

In accordance with the present invention, a circuit for controlling a qubit includes a superconducting qubit having a qubit frequency between approximately 0.8 GHz and 40 GHz and a resonant control system that is characterized by a resonant frequency. This resonant frequency is a function of an effective capacitance of the resonant control system as well as an effective inductance of the resonant control system. Further, at least one of the effective capacitance and the effective inductance is adjustable so that the resonant frequency of the resonant control system can be tuned to a predetermined resonant frequency. The circuit further includes a superconducting mechanism coherently coupled to the superconducting qubit and the resonant control system. The superconducting mechanism is used to coherently couple the superconducting qubit and the resonant control system together. In some embodiments, the resonant control system is superconducting.

In some embodiments of the present invention, controlling the coupling or entanglement of the superconducting qubit and the resonant control system can control evolution of the state of the superconducting qubit. For example, when the superconducting qubit and resonant control system are coupled, the state of the superconducting qubit evolves quantum mechanically. In contrast, if the superconducting qubit and resonant control system are de-coupled, the state of the superconducting qubit will not evolve. Evolution of the state of the superconducting qubit involves quantum tunneling between the superconducting qubit basis states, hence evolving as a coherent superposition of the basis states.

In an embodiment of the present invention, the superconducting qubit includes a superconducting system having two energy levels that form the basis states of the superconducting qubit. For example, one superconducting qubit that is useful in some embodiments of the present invention is a Josephson junction qubit. A Josephson junction qubit includes a Josephson junction and a current source for biasing the Josephson junction. See, Martinis et al., "Rabi oscillations in a large Josephson junction qubit", preprint presented at the American Physical Society (APS) 2002 Annual Meeting, held Jul. 27–31, 2002, which is hereby incorporated by reference. In some embodiments of the invention, in which the qubit is a Josephson junction qubit, a capacitor is provided in parallel with the Josephson junction and current source.

In other embodiments of the present invention, the superconducting qubit is a charge qubit, a phase qubit, or a flux qubit. For more information on charge qubits and phase qubits, see, for example, Makhlin et al., 2001, "Quantum-State Engineering with Josephson-Junction Devices", *Reviews of Modern Physics*, 73:357; Nakamura et al., 1999, *Nature*, 398:786; Friedman et al., 2000, *Nature*, 406:43; van der Wal et al., 2000, *Science*, 290:773, which are hereby incorporated by reference in their entirety.

In accordance with an embodiment of the present invention, the resonant control system includes an effective inductance and an effective capacitance. The resonant control system further includes a mechanism for tuning the resonant frequency of the resonant control system. In some embodiments of the present invention, a mechanism for tuning the resonant frequency of the resonant control system includes providing a Josephson junction in parallel with at least one inductor that contributes to the effective inductance of the system, such that providing a bias current across the Josephson junction can tune the effective inductance of the resonant control system, hence tuning the resonant frequency of the resonant control system.

In an embodiment of the present invention, the resonant control system is used to control quantum computation for the superconducting qubit or an array of superconducting qubits (e.g., a quantum register). In some embodiments, the resonant control system is used to mediate entanglements between superconducting qubits in the array of superconducting qubits. In this way, the resonant control system provides scalable, controllable entanglement operations for quantum computing.

An embodiment of the present invention includes a Josephson junction qubit, a resonant control system, and a superconducting mechanism having a capacitance for coupling the Josephson junction qubit and the resonant circuit.

A Josephson junction qubit includes a Josephson junction and a current source. In some embodiments of the present invention, the Josephson junction is placed in parallel with a capacitor. In order to perform quantum computation, the potential energy landscape of the Josephson junction is biased so that it has a three-level potential energy well. The current source provides a controllable bias current through the Josephson junction. The bias current through the Josephson junction is useful for creating the three-level potential energy well necessary for quantum computing in accordance with one embodiment of the present invention. In an embodiment of the invention, the two lowest energy levels of the potential well of the Josephson junction form the basis states of the Josephson junction qubit while the third energy level is used for measurement purposes. For example, the lowest energy level can represent state |0> and the second energy level can represent state |1>.

An advantage of the present invention is that it provides a method and structure for allowing superconducting qubits to evolve, where the same structure is also used to couple and hence entangle the quantum states of the superconducting qubits in a controllable manner. Because of this advantageous design, structures in the present invention support quantum computing operations. In accordance with an embodiment of the present invention, a structure for performing quantum computing includes a superconducting qubit, a resonant control system, and a superconducting mechanism having a capacitance for coupling the superconducting qubit and the resonant control system. In some embodiments of the invention, a mechanism for coupling includes providing a coherent link between the superconducting qubit and the resonant control system. In some embodiments of the invention, when the frequency of the resonant control system correlates with the energy difference between the two lowest energy levels of the superconducting qubit, the resonant control system and the superconducting qubit are coupled and behave quantum mechanically. To support this quantum mechanical behavior, the resonant control system and the superconducting qubit must be coherently coupled. That is, they must be coupled in such a way that the wave function of the superconducting qubit does not collapse and lose its quantum mechanical state.

FIG. 1 illustrates a Josephson junction qubit 110 and a resonant control system 120. Josephson junction qubit 110 and resonant control system 120 are coupled through superconducting mechanism 130. Josephson junction qubit 110 includes a current source 111-1, a Josephson junction 111-2, and a capacitor 111-3. In some embodiments of the present invention, circuit 100 is a superconducting system that is formed by conventional superconducting materials such as aluminum, niobium or tin. Other useful materials for constructing circuit 100 include, but are not limited to, insulating materials (such as oxides of metals or PMMA) or normal metals (such as gold and silver). For example, in some embodiments of the invention, Josephson junction 111-2 is a tunnel junction in which an insulating material separates the superconducting leads. Fabrication and behavior of Josephson junctions is described in, for example, J. Martinis et al., "Rabi oscillations in a large Josephson junction qubit", preprint presented at the American Physical Society (APS) 2002 Annual Meeting, held Jul. 27–31, 2002. Referring again to FIG. 1, Josephson junction 111-2 can be biased by current source 111-1 such that a three-energy level potential energy well is created. In some embodiments of the invention, Josephson junction 111-2 has a critical current $I_c$ that is about 0.1 to about 950 $\mu A$ (micro-Amperes).

Furthermore, in some embodiments of the present invention, the capacitance $C_j$ of capacitor 111-3 ranges from 0.1 Pico-Farads (pF) to 950 Pico-Farads. In one example, values useful for $I_c$ and $C_j$ are 21 μA and 6 pF respectively. Further, a bias current $I_b$ can range from 0.1 μA to 1 mA. For example, a bias current $I_b$ approximately equal to 20 μA is useful for creating a three-energy level potential well. Coupling capacitor 130 can have a capacitance $C_c$ approximately equal to $C_j/100$.

Referring again to FIG. 1, resonant control system 120 includes an inductor 121-2 and a capacitor 121-1. In some embodiments of the invention, resonant control system 120 can be a superconducting tunable resonant circuit, and can include any combination of elements for the creation of a tunable resonant circuit. In one embodiment, tuning resonant control system 120 comprises applying an external flux through loop 150. For example, an external flux can be applied by inductively coupling a current into resonant control system 120, where a circuit that includes at least a current source and an inductor is placed in proximity to 120. Methods for inductively coupling superconducting circuitry are described in U.S. Patent Application 60/372,958, filed Apr. 15, 2002, which is hereby incorporated by reference in its entirety. Values useful for inductor 121-2, L, and capacitor 121-1, C, depend on the embodiment of the invention. In an embodiment of the invention, L and C are chosen so that the resonant frequency of resonant control system 120 is on the order of the frequency required for interaction with qubit 110. In one example, useful values for resonant control system 120 are L≈80 pH (Pico-Henry) and C≈10 pF (Pico-Farad).

Figure 2A:
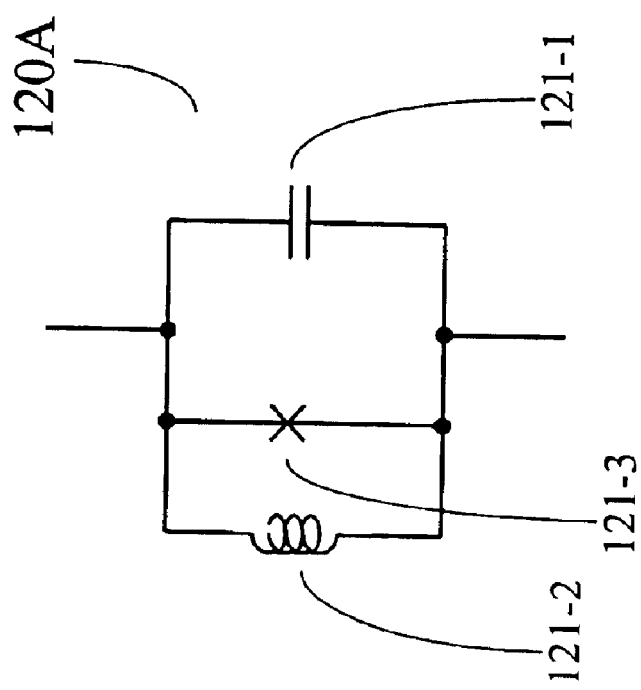
FIGS. 2A and 2B respectively illustrate tunable resonant circuits in accordance with various embodiments of the present invention.
Figure 2B:
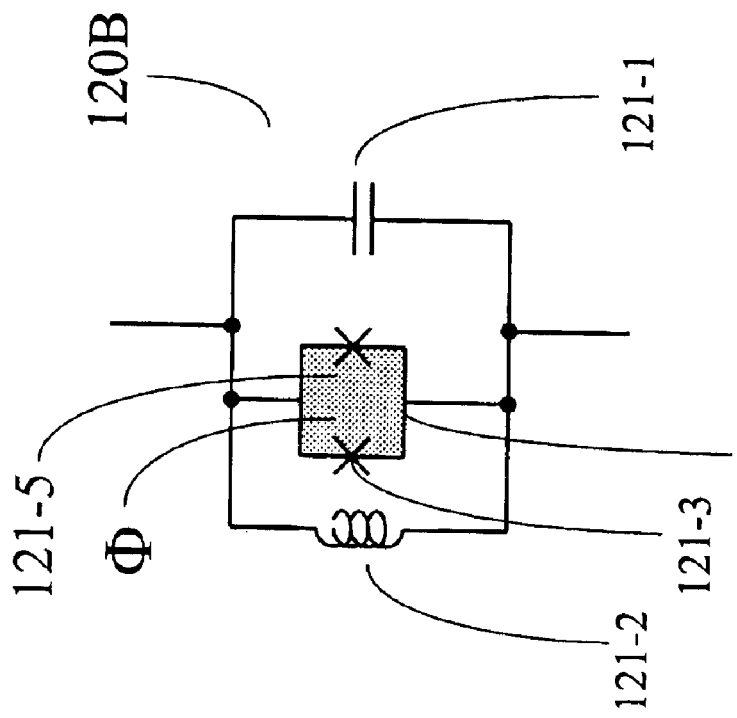

FIGS. 2A and 2B illustrate resonant control systems in accordance with various additional embodiments of the present invention. FIG. 2A illustrates a resonant control system 120A that includes inductor 121-2, capacitor 121-1, and Josephson junction 121-3. The resonance frequency of resonant control system 120A can be tuned by driving a dc-bias current across capacitor 121-1 and inductor 121-2. In an embodiment of the invention, the dc-bias current is less than the critical current of Josephson junction 121-3 so that resonant control system 120A remains superconducting throughout operation.

FIG. 2B illustrates a resonant control system 120B that includes inductor 121-2, capacitor 121-1, and direct current-superconducting quantum interference device (DC-SQUID) 121-4. A SQUID is extremely sensitive to the total amount of magnetic field that penetrates the area of the loop—the voltage measured across the device is very strongly correlated to the total magnetic field around the loop. An embodiment of a method for tuning resonant control system 120B includes applying an external flux Φ over the patterned area 121-5 in dc-SQUID 121-4. Application of the external flux Φ controls the state of dc-SQUID 121-4 such that dc-SQUID 121-4 behaves as a tunable Josephson junction. See, e.g., U.S. patent application Ser. No. 10/121,800, filed Mar. 16, 2002, which is hereby incorporated by reference in its entirety. In an embodiment of the present invention, controlling the state of dc-SQUID 121-4 by tuning external flux Φ provides a mechanism for tuning the resonant frequency of resonant control system 120B.

The Hamiltonian of circuit 100, which determines evolution of the quantum state of circuit 100, can be represented in the basis $\{|00\rangle, |01\rangle, |10\rangle, |11\rangle, |20\rangle, |21\rangle\}$, using standard ket notation. In ket notation, for a state x, "|x⟩" means the amplitude vector whose elements all have value zero except for the element indexed by x, which has value 1. In practice, the symbol used for x describes only part of the state of the system of interest; seen from the point of view of the whole system it represents an abstraction of all the states of the whole system that have some characteristic of interest (such as certain "bits" of the system's state description having certain values). In such situations, |x⟩ implicitly refers to a state vector of the whole system which has non-zero, equal values whose squares add up to 1 for all elements corresponding to x's being the case, and 0 for all other elements. This notation allows more concise description of local operations that affect only a part of the state of the circuit. Accordingly, the number on the left in the ket expression "$\{|00\rangle, |01\rangle, |10\rangle, |11\rangle, |20\rangle, |21\rangle\}$" represents the state or energy level of the superconducting qubit and the number on the right in the ket represents the state of the resonant control system.

The Josephson junction qubit has basis states correlated with the 0, 1, and 2 energy levels. When resonant control system 120 (e.g., 120A, 120B) has a frequency that correlates with the energy difference between the |0⟩ and |1⟩ basis states of the Josephson junction qubit, the coupled basis states |01⟩ and |10⟩ from above are degenerate. Hence, the relevant degenerate entangled states of the coupled system are:

$$\frac{|01\rangle \pm |10\rangle}{\sqrt{2}} \qquad \text{Equation 1}$$

In accordance with one aspect of the present invention, a superconducting qubit is used for quantum computation by controllably coupling the superconducting qubit with a resonant control system. In some embodiments, the frequency of the tunable resonant control system is tuned to correlate with the energy difference between the basis states of the superconducting qubit. The energy difference between the basis states of the superconducting qubit determines the qubit frequency. From a different perspective, the superconducting qubit frequency is equal to the inverse of its tunneling amplitude. The tunneling amplitude of the superconducting qubit is correlated with the difference between the relevant energy levels in the potential well that describes the superconducting qubit system. In such embodiments, the frequency of the resonant control system is tuned to correlate with the superconducting qubit frequency. The resonant control system correlates with the superconducting qubit frequency when the resonant frequency of the tunable resonant circuit is such that the circuit interacts with the superconducting qubit in a manner permitting quantum evolution of the state of the superconducting qubit. In some embodiments, such correlation requires the resonant control system to be tuned to a resonant frequency that is the same as the superconducting qubit frequency. In other embodiments, such correlation requires the resonant control system to be tuned to a resonant frequency that is an integer multiple of the qubit frequency. In these embodiments, the resonant control system can have at least two modes of operation. In the first mode, the frequency of the resonant control system correlates with the energy difference between the computational basis states of the superconducting qubit. In the second mode, the frequency of the resonant control system does not match the energy difference between the computational basis states of the superconducting qubit.

In other embodiments of the invention, the frequency of the resonant control system correlates with the energy difference between the computational basis states of the superconducting qubit, and a switch is provided to couple and de-couple the resonant control system and the superconducting qubit. Switches useful for controllable coupling of the resonant control system and the superconducting qubit include superconducting single electron transistors (SSETs). The behavior of the SSET is found in P. Joyez et al., 1994, Physical Review Letters 72, p. 11; and Born et al. 2001, IEEE Trans. App. Superconductivity 11, p. 373, which are hereby incorporated by reference in their entireties.

One aspect of the present invention provides a method for controlling a superconducting qubit in a circuit that includes a superconducting qubit, a resonant control system, and a superconducting mechanism. The superconducting mechanism has a capacitance for coupling the resonant control system and the superconducting qubit together. In the method, the resonant control system is tuned to a resonant frequency $f_i$ for some duration $t_i$. The resonant frequency $f_i$ of the resonant circuit and the duration $t_i$ of the coupling are application dependent. In some embodiments, resonant frequency $f_i$ correlates with the energy difference between the basis states of the superconducting qubit. In some embodiments of the invention, resonant frequency $f_i$ of the resonant control system correlates with the tunneling amplitude $\Delta$ of the superconducting qubit as a function of the relationship $f_i \propto \Delta^{-1}$. In some embodiments of the invention, resonant frequency $f_i$ is on the order of a Giga-Hertz (GHz). Resonant frequencies useful for the present invention range between approximately 0.8 GHz and 40 GHz. Duration $t_i$ of the coupling is application dependent but generally correlates with the tunneling amplitude $\Delta$ of the superconducting qubit or the energy difference between the basis states of the superconducting qubit. For example, in some embodiments of the invention, duration $t_i$ is approximately $\pi/2$, where $2\pi$ represents a full period of evolution.

In an embodiment of the present invention, the superconducting qubit can evolve quantum mechanically when it is coupled to the resonant control system. Further, the state of the superconducting qubit can remain fixed when the resonant control system is not coupled to the superconducting qubit.

Another embodiment of the present invention provides a quantum register for controllable entanglement of an array of superconducting qubits. In some embodiments, the array of superconducting qubits comprises two or more superconducting qubits, three or more superconducting qubits, 10 or more superconducting qubits, 50 or more superconducting qubits, between 10 and 100 superconducting qubits, more than 100 superconducting qubits, or less than 1000 superconducting qubits. An embodiment of the present invention provides at least two superconducting qubits, at least one tunable resonant control system, and a superconducting mechanism having a capacitance for coupling at least two of the superconducting qubits to one of the at least one resonant control system.

An embodiment of the present invention provides a method for entangling a quantum state of a first qubit with a quantum state of a second qubit. The method comprises tuning a resonant control system, which is capacitively or inductively coupled to the first qubit and the second qubit, to a first frequency for a first period of time. This first frequency corresponds to an energy differential between a first potential energy level and a second potential energy level of the first qubit. Then, the resonant control system is adjusted to a second frequency for a second period of time that is sufficient for the resonant control system to entangle with the second superconducting qubit. The second frequency corresponds to an energy differential between a first potential energy level and a second potential energy level of the second qubit. Hence, when the resonant control system is entangled with the second superconducting qubit, the quantum state of the first superconducting qubit is coupled to the state of the second superconducting qubit through quantum mechanical interaction.

Entanglement of the quantum states of superconducting qubits is a completely quantum mechanical operation that has no classical counterpart. In some embodiments of the invention, the entanglement operation leaves the state of the resonant control system unentangled with the states of the first and second qubit.

Some embodiments of the present invention further provide for entangling the states of a first superconducting qubit and a second superconducting qubit in a quantum register by coupling the resonant control system to the first superconducting qubit for a duration $t_3$. The third entanglement removes entanglement of the tunable resonant control system with the superconducting qubits in the entanglement operation. This entanglement operation implements a square root of SWAP logical operation, which is sufficient, along with single qubit operations, to perform quantum computing. For more details on SWAP operations, see Blais, 2001, Physical Review A 64, 022312, which is hereby incorporated by reference in its entirety.

Figure 3:
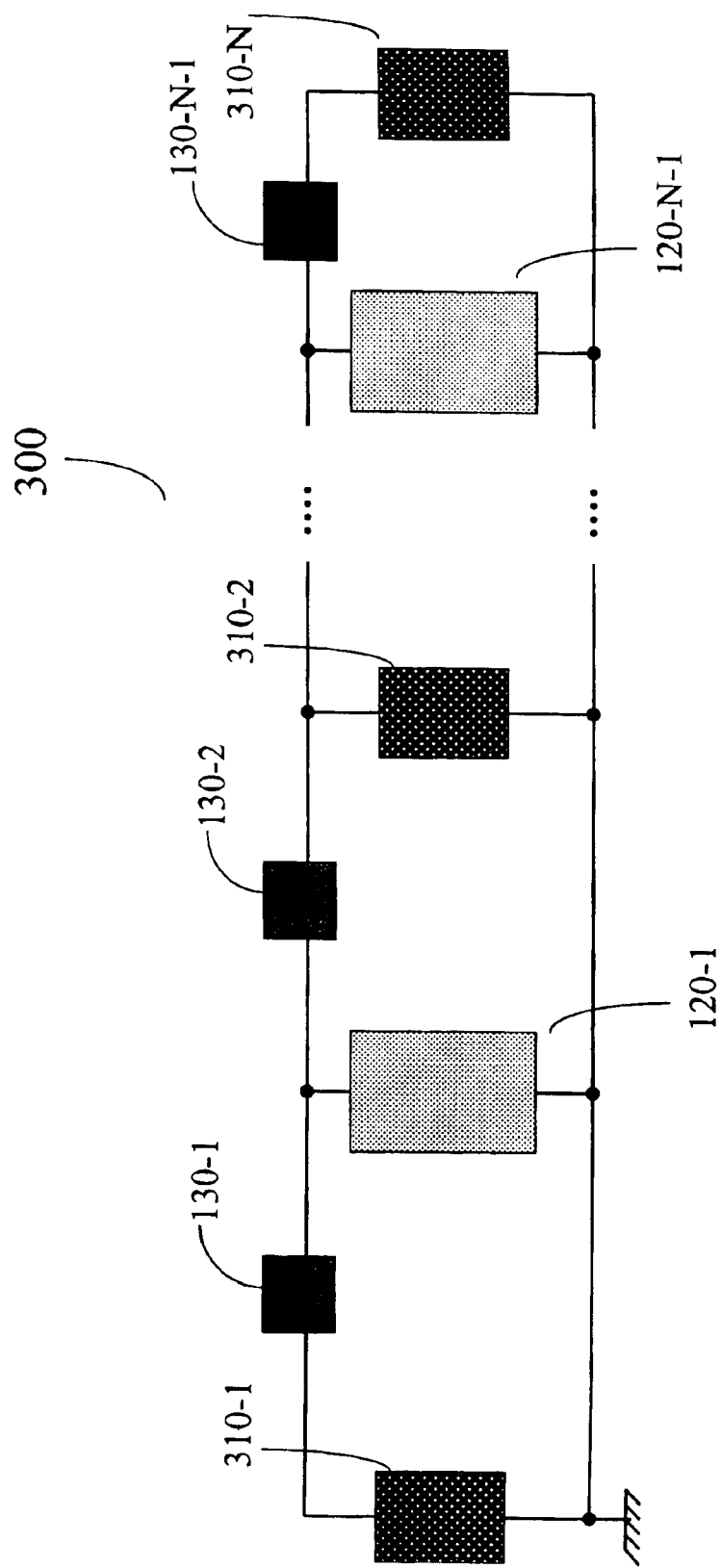
FIG. 3 illustrates a system for providing entanglement operations for qubits in a quantum register in accordance with an embodiment of the present invention.

FIG. 3 illustrates an embodiment of the invention for a system providing entanglement operations for superconducting qubits in a quantum register. FIG. 3 illustrates a quantum register and control system 300, which comprises an array of superconducting qubits 310-1 through 310-N, tunable resonant control systems 120-1 through 120-N-1, and superconducting mechanisms 130-1 through 130-N-1 for coupling qubits 310 to resonant control systems 120. In some embodiments of the invention, at least one of superconducting qubits 310-1 through 310-N is the same as superconducting qubit 110, illustrated in FIG. 1. Further, resonant control systems 120-1 through 120-N-1, are interchangeably illustrated in FIGS. 1, 2A, and 2B as resonant control systems 120, 120A, and 120B. In some embodiments of the present invention, superconducting mechanisms for coupling 130-1 through 130-N-1 are capacitors as illustrated in FIG. 1 and discussed in detail above. In other embodiments of the present invention, mechanisms for coupling 130-1 through 130-N-1 can be coherent switches such as SSETs, described above.

In some embodiments of the present invention, a resonant control system can be used to provide non-nearest neighbor interactions between superconducting qubits in a quantum register. For example, a resonant control system can be coupled to an $n^{th}$ superconducting qubit in a quantum register for some duration $t_1$, and then the resonant control system can be coupled to an $m^{th}$ superconducting qubit in the quantum register for some duration $t_2$. After the entanglement operation has been performed and the quantum states of the $n^{th}$ and $m^{th}$ superconducting qubits in the quantum register have been entangled, the resonant control system can be used for subsequent operations. In some embodiments, as described in detail above, a third operation can couple the resonant control system to the first superconducting qubit in the quantum register for some duration $t_3$. The durations $t_1$ and $t_3$ are the same, and correlate with a period of $\pi$, and the duration $t_2$ correlates with a period of $\pi/2$.

Figure 4:
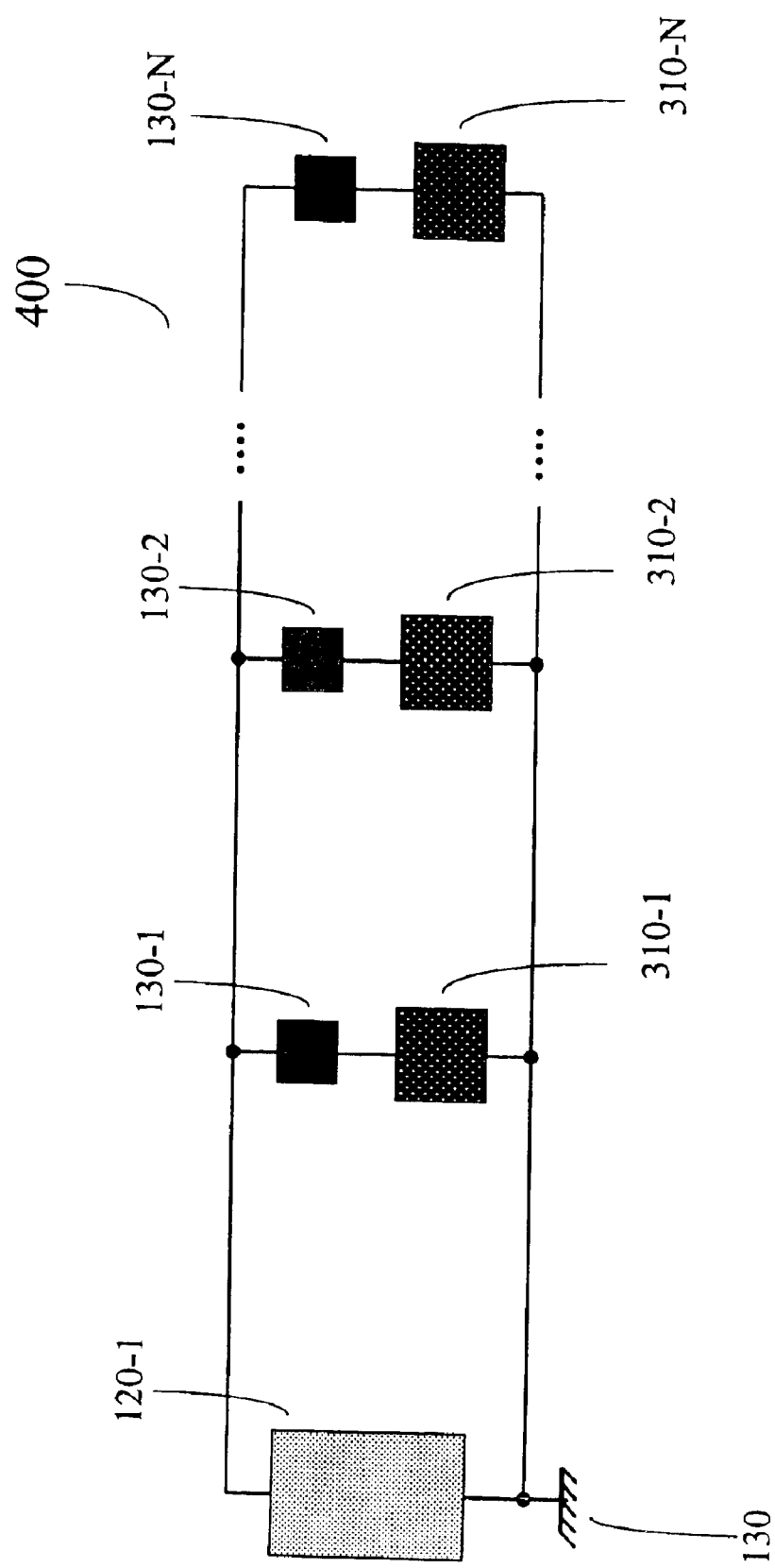
FIG. 4 illustrates a structure in which at least one tunable resonant circuit is coupled to a plurality of qubits using a coupling mechanism in accordance with one embodiment of the present invention.

FIG. 4 illustrates a circuit 400 in which at least one resonant control system 120-1 is coupled to a plurality of superconducting qubits 310-1 through 310-N, through respective coupling mechanisms 130-1 through 130-N. In some embodiments of the invention, a plurality of resonant control systems 120-1 through 120-M can be coupled to one or more superconducting qubits 310 in system 400. Different resonant control systems 120-1 through 120-M can be coupled to groups of superconducting qubits with some overlap between the respective groups.

Another embodiment of the present invention provides apparatuses and methods for entangling the states of a first qubit and a second qubit by using a parallel LC-circuit (tank circuit). In some embodiments, the tank circuit is a resonant control system that has a potential energy profile that includes a potential energy well. Preferably, the energy levels within the potential energy well are spaced apart on a nonlinear basis. In some embodiments, the resonant control system is a Josephson junction qubit, such as the Josephson junction qubit 110 illustrated in FIG. 1. In such embodiments, the resonant control circuit includes a DC current source 111-1, a Josephson junction 111-2, and a capacitor 111-3. In some embodiments, capacitor 111-3 is optional. In embodiments where a capacitor 111-3 is not used, the inherent capacitance of the Josephson junction 111-2 is sufficient.

Resonant control systems, such as Josephson junction qubit 110, have an intrinsic capacitance and inductance and therefore can form anharmonic (nonharmonic) resonators. This makes them suitable candidates for a resonant control system in accordance with various embodiments of the present invention. One novel feature of the present invention is the use of resonant control systems, such as Josephson junction qubit 110, to entangle qubits. Such resonant control systems can entangle qubits of the same type. Furthermore, resonant control systems of the present invention can entangle qubits that are not the same type. For example, a resonant control system can be used to interchangeably entangle charge qubits, flux qubits, and phase qubits. In one case, the resonant control circuit is used to mediate operations between different types of qubits in the same system.

In some embodiments of the present invention, a resonant control system is used to stimulate controlled coherent evolution of a superconducting qubit. In particular, in some embodiments, the resonant control circuit includes a capacitively shunted Josephson junction and a mechanism for applying a bias current across the junction. As described above, one example of such a system is the Josephson junction qubit 110 (FIG. 1). In order to achieve a suitable potential energy profile, the resonant control system is biased with a biasing current. In the case of Josephson junction qubit 110 (FIG. 1), this biasing current is provided by DC current source 111-1. The magnitude of the bias current is a function of the energy level separation in the potential energy well that describes the Josephson junction. In other words, the magnitude of the bias current is a function of the physical characteristics of the Josephson junction in the resonant control system. Preferably, the magnitude of the bias current is less than the critical current $I_c$ of the Josephson junction. The critical current $I_c$ of a Josephson junction is the amount of current that drives the junction from (a) a first state where the Josephson junction has no voltage potential and superconducting current can flow through the junction without impedance to (b) a second state in which the Josephson junction has a voltage potential. The magnitude of $I_c$ depends on the characteristics of the Josephson junction. In some resonant control systems of the present invention, a bias current of about $0.994 * I_c$ or less is used. In other resonant control systems of the present invention, a bias current of about $0.990 * I_c$ or less is used.

In some embodiments of the present invention, a system for controlling evolution of the quantum state of a superconducting qubit includes a superconducting qubit that is capacitively coupled to a resonant control system. The superconducting qubit includes any superconducting qubit in which operations for initializing the qubit, evolving the qubit, and reading out the quantum state of the qubit can be performed. Such qubits include phase qubits and charge qubits. In other embodiments of the present invention, the superconducting qubit is inductively coupled to the resonant control system. Inductive coupling is useful for superconducting qubit embodiments where alternate fabrication methods are necessary. See, e.g., U.S. patent Ser. No. 10/025,848, entitled "FINGER SQUID QUBIT DEVICE" to Tsalenchouk et al., filed Dec. 17, 2001, which is hereby incorporated by reference in its entirety.

The potential energy profile of the Josephson junction in a resonant control system, in accordance with one embodiment of the present invention, will now be described. The potential energy profile of the Josephson junction includes non-linearly spaced energy levels within a potential energy well. Further, the probability of escape from this potential energy well due to tunneling under the potential barrier is preferably low. Such a potential energy profile is desirable because escape from the potential energy well results in a potential voltage drop across the Josephson junction that destroys all quantum state information present in the resonant control system. To achieve such a potential energy profile, the resonant control system is preferably biased with a bias current of about $0.994 * I_c$ or less. The value $I_c$ refers to the critical current value of the Josephson junction in the resonant control system.

Figure 5A:
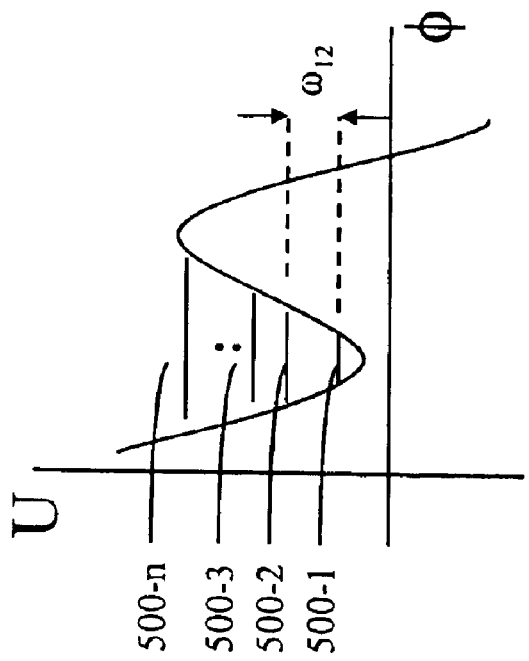
FIG. 5 illustrates potential energy profiles for biased resonant control circuits that includes a Josephson junction, in accordance with one embodiment of the present invention.

FIG. 5A illustrates the potential energy profile for the Josephson junction in a resonant control system that is biased with a current of about $0.994 * I_c$ or less. When biased with such a current, the system has three energy levels (1, 2, and 3) that can be used for quantum operations. Preferably, the current-bias source, such as 111-1 (FIG. 1), has a precision of about $10^{-3}$ parts in 100 nA or better, where nA equals $10^{-9}$ Amperes. This means that current-bias source 111-1 is preferably stable to about 0.1 nA. Such precision is preferred because a major source of decoherence in quantum systems arises from fluctuations in the bias current. Fluctuation in the bias current correlates with fluctuation in the potential well and hence represents a source of dissipation in the system. This degree of precision is needed in order to set the bias current to the precise values required to achieve the desired potential energy profile. Current sources with this degree of precision are commercially available.

Figure 5B:
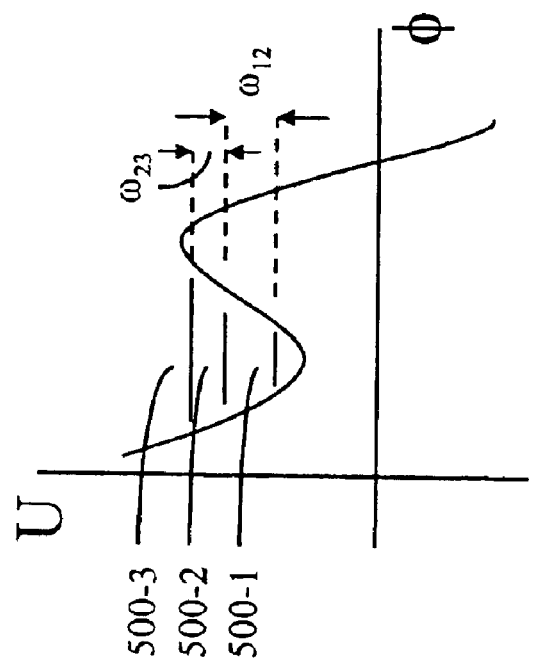

FIG. 5B illustrates the potential energy profile for the Josephson junction in a resonant control system that is biased with a current of $0.992 * I_c$ or less. In fact, the resonant control system profiled in FIG. 5B is the same as the resonant control system profiled in FIG. 5A. However, it is clear that the potential energy profile of FIG. 5B is not the same as the potential energy profile FIG. 5A. In particular, the potential energy profile in FIG. 5B has a deeper well. Thus, there are more energy levels in FIG. 5B than in FIG. 5A. The deeper potential energy well found in FIG. 5B is achieved by using a lower biasing current (about $0.994 * I_c$ or less in FIG. 5A as opposed to about $0.992 * I_c$ or less in FIG. 5B). In FIG. 5B, the lowest energy levels are isolated at the bottom of a deep potential energy well. A system with the potential energy profile illustrated in FIG. 5B functions as a resonant control circuit because the probability of transition to the voltage state, which occurs when the phase escapes the potential energy well, is low.

A Josephson junction qubit used in quantum computing preferably has the potential energy profile illustrated in FIG. 5A It is known that a Josephson junction can operate as a qubit. See, e.g., Martinis et al., "Rabi oscillations in a large Josephson junction qubit", preprint presented at the American Physical Society (APS) 2002 Annual Meeting, held Jul. 27–31, 2002; and Yu et al., 2002, Science 296, p. 889, which are hereby incorporated by reference in their entireties. In particular, a Josephson junction can operate as a qubit when the qubit is biased with a bias current in such a manner that the potential energy profile of the qubit has at least two energy levels in a potential energy well that can serve as qubit basis states (e.g., see FIG. 5A). Such a profile is preferred because it includes two or three potential energy states trapped in a potential energy well. The well is sufficiently deep to include two or three states but is not too deep. Therefore, the first and second states can serve as qubit basis states and the optional third state can potentially serve as a readout state. In order to read out the state of a qubit, there must be a sufficient rate at which phase escapes the potential energy well. For this reason, a potential energy well, such as that described in FIG. 5A, is preferred because phase can easily tunnel out of the potential well from the third energy level. Thus, the resonant control system having a Josephson junction, which is modeled in FIG. 5A, can serve as a qubit.

Since qubit readout depends on measuring a voltage state, a system having the potential energy profile illustrated in FIG. 5B, on the other hand, does not serve as an ideal qubit. The potential energy well is so deep that the probability of tunneling out of the potential well is very low. This makes readout of the qubit more difficult. However, a system having a potential energy profile illustrated in FIG. 5B is useful for mediating entanglement operations and storing quantum information. This is because mediation of entanglement operations and the storage of quantum information does not require a readout. The bias current used to produce the profile illustrated in FIG. 5B is 0.992*L or less. It will be appreciated that, while the potential energy profile in FIG. 5A is not preferred, resonant control systems having such a potential energy profile can be used in the present invention.

It is known in the art that controlled entanglement of quantum states of Josephson junction qubits is difficult when there is no intermediate mechanism for mediating the entanglement operation. Yet it is precisely this form of entanglement that is needed in order to build quantum computing devices that fully exploit the power of quantum computations. The problem of entangling qubits becomes more difficult when the qubits that are to be entangled are not the same type (e.g. phase qubit versus charge qubit). In such situations, an intermediate mechanism is typically needed. The present invention provides novel ways for entangling qubits using the resonant control system described above. That is, some embodiments of the present invention use the resonant control system as an intermediate mechanism. The resonant control system can be used both in a homogenous environment, where qubits of the same type are entangled, and a heterogeneous environment where different types of qubits are entangled. Thus, the intermediate mechanism allows for quantum heteroregisters in which different types of superconducting qubits are entangled. As used herein, a heteroregister is a plurality of qubits, wherein at least one qubit in the plurality of qubits is different than another qubit in the plurality of qubits and wherein each qubit in the plurality of qubits can be entangled with another qubit in the plurality of qubits. Thus, an advantage of heteroregisters is the ability to entangle different types of superconducting qubits, such as charge qubits, flux qubits, and phase qubits. For a review of various types of qubits, see Makhlin et al., 2001, "Quantum-State Engineering with Josephson-Junction Devices", Reviews of Modern Physics, 73:357, as well as U.S. patent Ser. No. 10/025,848, entitled "FINGER SQUID QUBIT DEVICE", to Tsalenchouk et al., filed Dec. 17, 2001, which are hereby incorporated by reference in their entireties.

The characteristics of the resonant control system, in accordance with some embodiments of the present invention, will now be described. In some embodiments, the resonant control system includes a Josephson junction and a current source for driving a bias current across the Josephson junction as described in detail above. Referring to FIG. 5B, at appropriate bias currents, energy levels of 501-1 and 501-2 are isolated from the environment by higher energy levels in a deep energy well. Therefore, quantum information stored as a superposition of the two lowest energy levels maintains coherence for a longer time period since dissipation due to tunneling out of the potential well that holds energy levels 500-1 and 500-2 is reduced. As described in further detail below, in some embodiments, the quantum state of a superconducting qubit is stored by entangling the qubit with the resonant control circuit.

Figure 6:
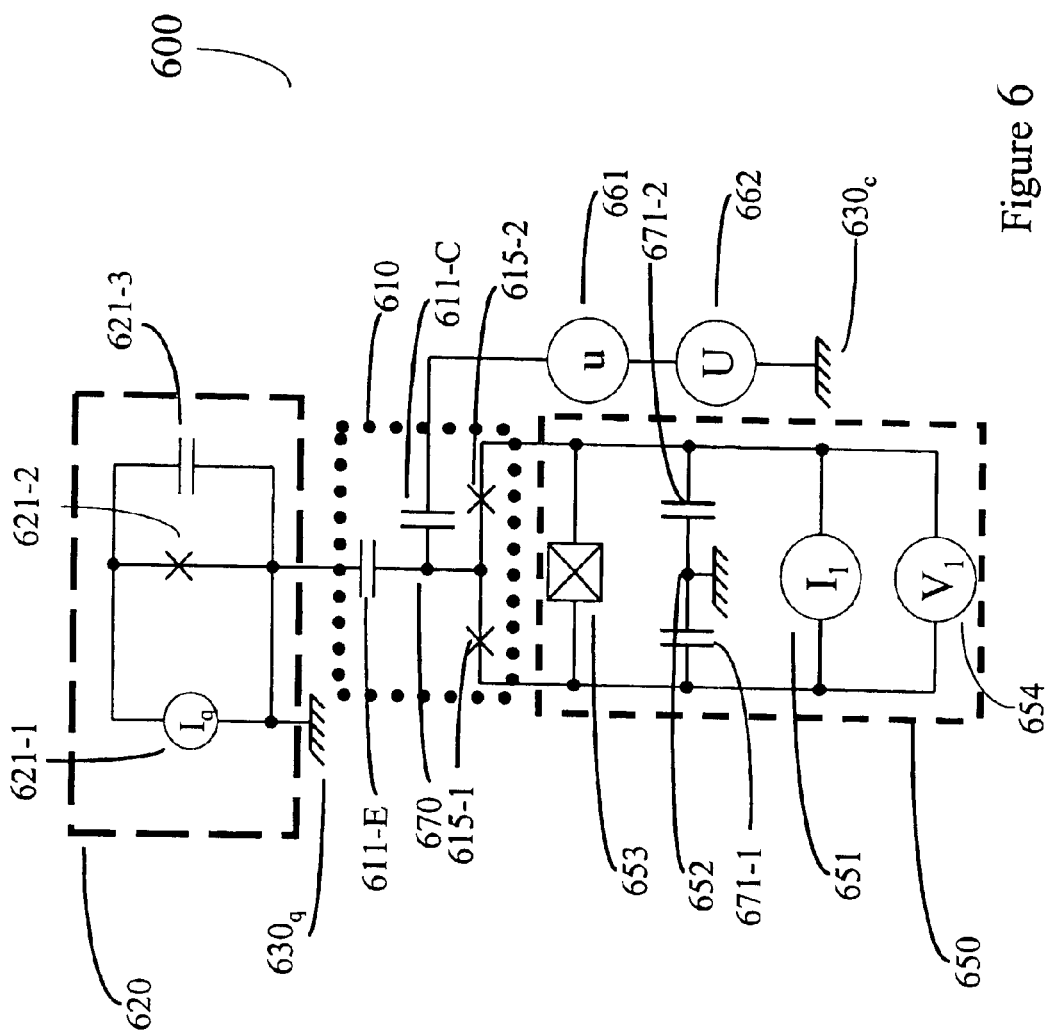
FIG. 6 illustrates an embodiment of the present invention in which a resonant control system is capacitively coupled to a superconducting charge qubit that is, in turn, coupled to a readout device.

FIG. 6 illustrates an embodiment of the present invention in which a resonant control system 620 is capacitively coupled to a superconducting qubit 610 through capacitor 611-E. As is well known in the art, qubits used in quantum computing are typically mesoscopic. A mesoscopic system is a system that exhibits quantum mechanical behavior as opposed to classical mechanical behavior. Therefore, capacitive coupling is used in FIG. 6 to isolate the qubit from phase fluctuations that could decohere the quantum state of qubit 610. As illustrated in FIG. 6, qubit 610 is a superconducting charge qubit having a mesoscopic island region 670 separated from leads by Josephson junctions 615-1 and 615-2 and capacitors 611-C and 611-E. Charge device 662 is used to maintain the potential energy profile of charge qubit 610 in a regime that can be used for quantum computation. In one example, charge device 662 provides a gate voltage $V_g$ that controls the charging energy of island 670 of charge qubit 610. The potential energy state of charge qubit 610 is determined (read out) using readout device 650.

Readout device 650 includes junction 653, a current source 651, a ground 652, and a voltmeter 654. Junction 653 plays the role of changing the behavior of qubit 610 to the nonhysteretic, overdamped mode. In some less preferred embodiments, junction 653 is a shunt resistor made of normal metal. In other embodiments junction 653 is a Josephson junction with a large normal conductance and small resistance. Methods for providing current source 651 are well known in the art. Current source 651 can be controlled from room temperature equipment using appropriate low-temperature filters. Methods for providing voltmeter 654 are well known in the art. In some embodiments of the invention, the leads connecting to voltmeter 654 can pass through a cold amplifier to be sampled at room temperature.

Methods for fabricating superconducting charge qubit 610 are well known in the art. See, e.g., Vion et al., 2002, Science 296, p. 886, which is hereby incorporated by reference in its entirety. Grounding mechanism 652 is capacitively isolated from readout device 650 by capacitor 671-1 and capacitor 671-2. In one embodiment, coherent control of the state of qubit 610 is achieved by application of a microwave signal directly to mesoscopic island region 670. The microwave signal has a frequency $v_{01}$ that corresponds to the energy level separation between the 10>and 11>basis states of the qubit (e.g. the lowest two potential energy levels of the qubit in the potential energy profile of the qubit). As described in detail above for a different system, a microwave signal with the appropriate frequency causes transitions between the basis states of the qubit, hence providing manipulation of the qubit state. For more information on this phenomenon, see Yu et al., Science 296, p. 889–891, which is herein incorporated by reference in its entirety. In FIG. 6, the microwave signal is applied by A/C current source 661, which emits a frequency that is in the microwave range. Frequencies useful for embodiments of the invention range from approximately 10 GHz to 30 GHz.

Referring to FIG. 6, resonant control system 620 includes current source 621-1, Josephson junction 621-2, shunt capacitance 621-3, and ground $630_q$. In some embodiments, shunt capacitance 621-3 is an intrinsic property of Josephson junction 621-2 that is modeled as illustrated in FIG. 6 as an ideal Josephson junction 621-2 in parallel with a capacitance 621-3. Therefore, in some embodiments of the present invention, there is no physical capacitor that corresponds to 621-3. Rather, 621-3 refers to the intrinsic capacitance of Josephson junction 621-2.

Using circuit 600, the quantum state of charge qubit 610 can be entangled with the state of resonant control system 620. In some embodiments, ground $630_q$ is capacitively isolated from resonant control system 620.

Figure 7:
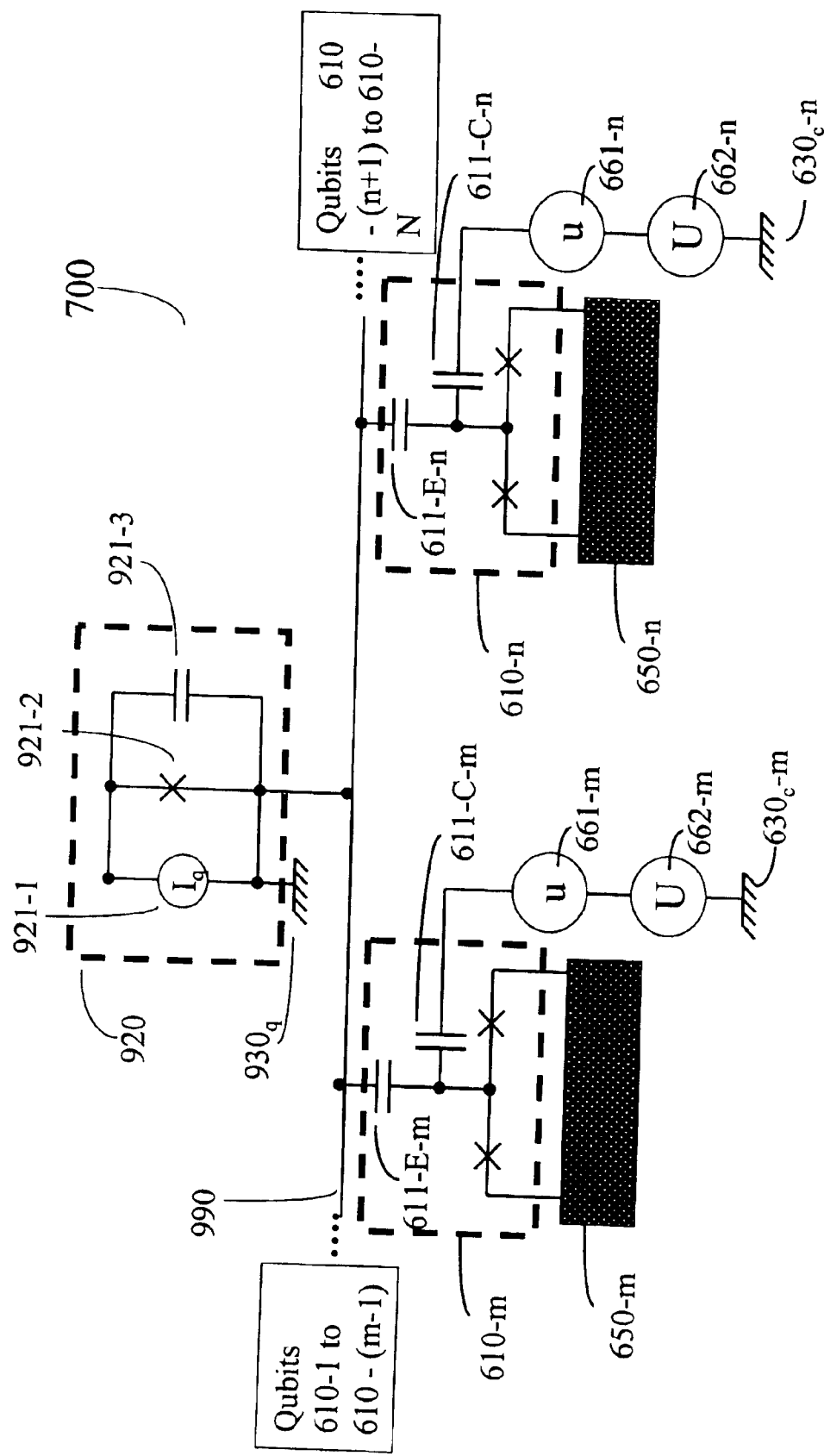
FIG. 7 illustrates a quantum register in accordance with one embodiment of the present invention.

Circuit 600 (FIG. 6) can be scaled to include a plurality of qubits 610. In such a scaled design, resonant control system 620 is used to modulate entanglement operations between qubits 610. FIG. 7 illustrates an embodiment of the present invention that includes an array of qubits 610-1 through 610-N, and at least one resonant control system 920. In some embodiments, resonant control system 920 is coupled to each qubit in an array of qubits in order to modulate entanglement operations between qubits in the array.

FIG. 7 illustrates resonant control system 920 that is in electrical communication with bus 990. In some embodiments resonant control system 920 (FIG. 7) is identical to resonant control system 620 (FIG. 6). As illustrated in FIG. 7, resonant control system 920 includes current source 921-1, Josephson junction 921-2, shunt capacitance 921-3, and ground $930_q$.

Bus 990 is capacitively coupled to qubits 610-1 through 610-N by respective capacitors 611-E-1 through 611-E-N (only capacitor 611-E-m and capacitor 611-E-n is shown in FIG. 7). In an embodiment of the present invention, bus 990 is a superconducting structure having geometric proportions that approximate a line. However, bus 990 can have more intricate geometric proportions, such as a grid layout. All such bus 990 geometries are within the scope of the present application. In one embodiment, qubits 610-1 through 610-N are electrically coupled to bus 990 in such a manner that resonant control system 920 can be used to mediate entanglement operations between qubits 610-1 through 610-N. In order to achieve such entanglement operations, resonant control system 920 must be in close proximity to qubits 610-1 through 610-N. The potential energy state of each charge qubit 610 is determined (read out) using a corresponding readout device 650.

The structure of a device 700 which includes a resonant control system 920 has been disclosed (FIG. 7). The structure includes an array (e.g., register, quantum register) of two or more qubits 610. At least two of the qubits 610 in the register are capacitively coupled to resonant control system 920. A method for using device 700 to entangle qubits 610 will now be described.

First, the resonant control system 920, is tuned to a frequency $\omega_{12}$ for a first period of time $t_1$. The frequency $\omega_{12}$ is the energy differential between a first potential energy level and a second potential energy level (e.g., the lowest two potential energy levels) of a first qubit 610. Resonant control system 920 is tuned to the energy differential $\omega_{12}$ by adjusting the bias current provided by current source 921-1 (FIG. 7). Typically, only small adjustments are made to the bias current. In a hypothetical example, an adjustment of the bias current from $0.990*I_c$ to $0.9894*I_c$ is all that is required to achieve the frequency $\omega_{12}$. In some embodiments, the current is adjusted by 1 micro-Ampere or less. In some embodiments, the current is adjusted by 100 nanoAmperes or less.

When resonant control system 920 is tuned to frequency $\omega_{12}$, the energy differential between the lowest two potential energy states in the resonant control system 920 is the same as the energy differential between a first potential energy level and a second potential energy level (e.g., the lowest two potential energy levels) of first qubit 610. The length of time $t_1$ is application dependent. In some embodiments, $t_1$, is one millisecond or less. In other embodiments, $t_1$, is one microsecond or less. In still other embodiments, $t_1$, is one hundred nanoseconds or less. In yet other embodiments, $t_1$, is ten nanoseconds or less. In some embodiments, time period $t_1$ is a function of the length of a time period $t_2$ described below. In any event, the length of time that resonant control system 920 is tuned to a frequency $\omega_{12}$ is sufficiently long to entangle the quantum state of resonant control system 920 with the quantum state of the first qubit 610.

Next, resonant control system 920 is tuned to a second frequency $\omega_{12}'$ for a second period of time $t_2$ by adjusting bias current 621-1. The frequency $\omega_{12}'$ represents the energy differential between a first potential energy level and a second potential energy level (e.g., the lowest two potential energy levels) of a second qubit 610. The length of time $t_2$ is application dependent. In some embodiments, $t_2$ is one millisecond or less. In other embodiments, $t_2$ is one microsecond or less. In still other embodiments, $t_2$ is one hundred nanoseconds or less. In yet other embodiments, $t_2$ is ten nanoseconds or less. In some embodiments, time period $t_2$ is a function of the length of a time period $t_1$. In any event, the length of time that resonant control system 920 is tuned to a frequency $\omega_{12}'$ is sufficiently long to entangle the quantum state of resonant control system 920 with the quantum state of the second qubit 610. As a result, the quantum state of the first and second qubits become entangled. This entangled state is stored in both the first and second qubits and resonant control system 920.

In some embodiments of the present invention, the method includes a third step in which resonant control system 920 is tuned to the first frequency $\omega_{12}$ for time period $t_1$. In such embodiments, time periods $t_1$ and $t_2$ correlate with the $\pi$ and $\pi/2$ period evolutions. This results in a $\pi_1$-$\pi/2$-$\pi_2$ pulse sequence. The pulse $\pi_1$ corresponds to one half of the period ($2\pi_1$) of the system consisting of the resonant control system 920 and the first qubit 610 when they are entangled. The pulse $\pi/2$ corresponds to one quarter of the period ($2\pi$) of the system consisting of the resonant control system 920 and the second qubit 610 when they are entangled. The pulse $\pi_2$ corresponds to one half of the period ($2\pi_2$) of the system consisting of the resonant control system 920 and the first qubit 610 when they are entangled. This pulse sequence performs a quantum $(SWAP)^{1/2}$ operation, leaving the first and second qubits 610 entangled while the resonant control system 920 is not entangled with either qubit. The time periods $t_1$, and $t_2$ that correlate with $\pi$ and $\pi/2$ period evolutions depend on the physical characteristics of the resonant control system 920 and the first and second qubits 610. Typically, however, the entire operation is performed in nanoseconds. For more details on SWAP operations, see Blais, 2001, Physical Review A 64, 022312, which is hereby incorporated by reference in its entirety.

It will be appreciated that there are limits to how large bus 990 (FIG. 7) can be made because quantum state coherence can only be maintained over limited distances. Thus, there is a limit to how many qubits 610 can be capacitively or inductively connected to bus 990 in the configuration illustrated in FIG. 7. To address this limitation, some embodiments of the present invention divide bus 990 into sections using a series of switches and, optionally, pivot qubits. In such embodiments, the quantum register includes a plurality of qubits and a plurality of resonant control systems. The qubits in the quantum register are separated into groups and each group of qubits is associated with a resonant control system. Each group of qubits is controlled by a switch that typically is in an open state, thereby isolating the qubits from other groups of qubits linked to bus 990. In some embodiments, pivot qubits are placed in regions adjoining each qubit group. The pivot qubits facilitate interaction between qubits in different qubit groups in a manner that will be described below.

Figure 8:
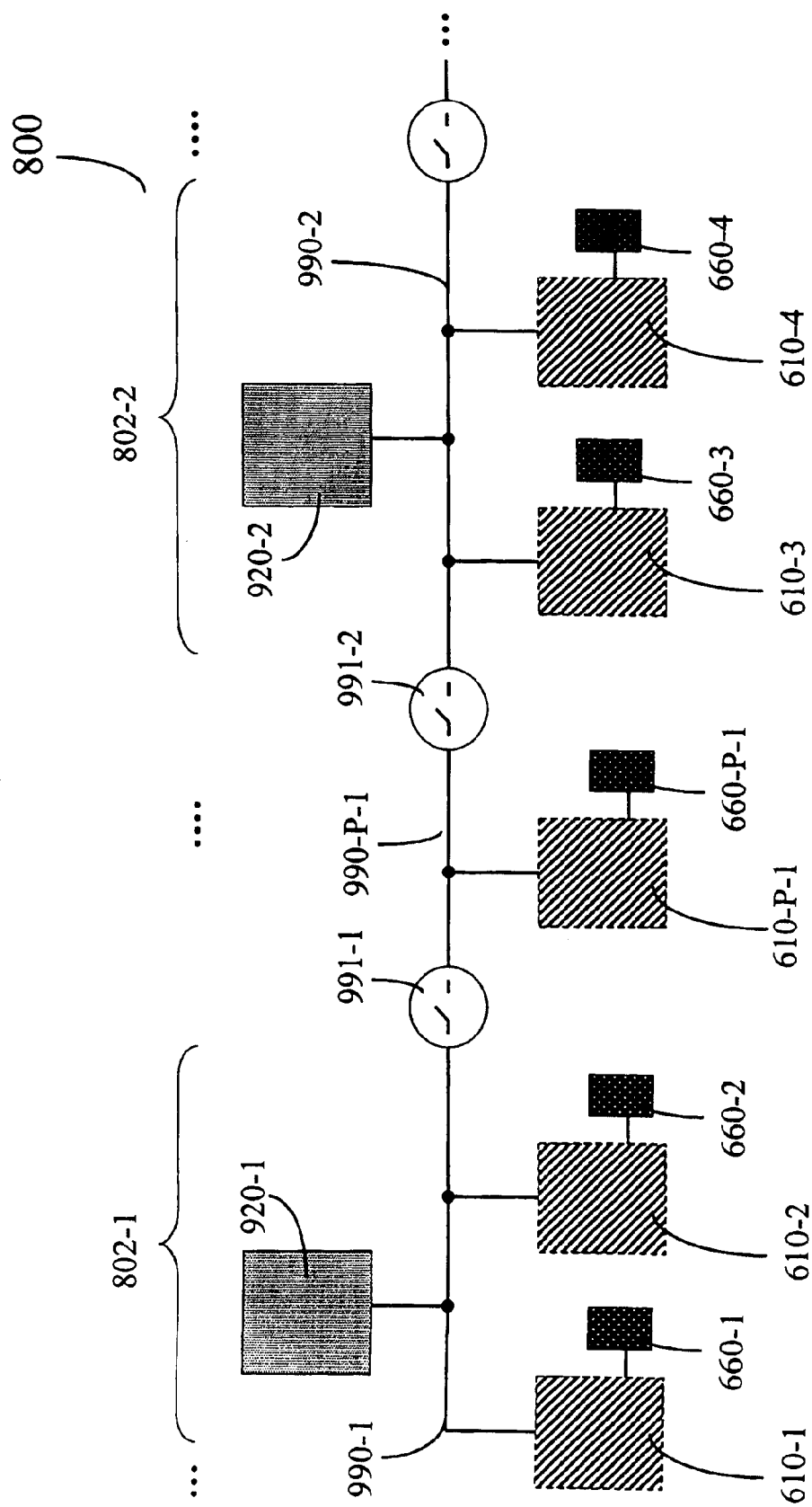
FIG. 8 illustrates a quantum register in accordance with another embodiment of the present invention.

FIG. 8 illustrates quantum register 800 in which bus 990 is divided into sections.

Quantum register 800 includes qubit groups 802-1 and 802-2. Each qubit group 802 is associated with a different resonant control system 920. Inter-group qubit 610—qubit 610 operations are performed using quantum register 800. The number of qubits 610 in each group 802 is application dependent. In some embodiments, there are two qubits in each qubit group. In other embodiments, there are more than two qubits 610 in each qubit group 802. Instill other embodiments, there are five or more qubits 610 in each qubit group. In yet other embodiments, there are ten or more qubits 610 in each qubit group. Further, there is no requirement that each group 802 have the same number of qubits 610.

In FIG. 8, quantum register 800 has qubit groups 802-1 and 802-2. Qubit group 802-1 includes qubits 610-1 and 610-2, resonant control system 920-1, and bus segment 990-1. Qubit group 802-2 includes qubits 610-3 and 610-4, resonant control system 920-2, and bus segment 990-2. Qubits 610-1 through 610-4 are respectively associated with devices 660-1 through 660-4. Each device 660 is a mechanism for controlling the quantum state of the corresponding qubit 610. In some embodiments, each device 660 controls the quantum state of the corresponding qubit 610 by providing a gate voltage or a microwave signal. For example, in one embodiment, each device 660 includes an A/C current generator 661, a charge device 662, and a ground $630_c$ as illustrated in FIG. 7. In an embodiment of the present invention, at least one qubit 610 in FIG. 8 is a superconducting charge qubit and at least one resonant control system 920 in FIG. 8 is a resonant control system 620 (FIG. 6).

FIG. 8 further illustrates switches 991-1 and 991-2 that isolate region 990-P-1. In some embodiments of the present invention, switches 991-1 and 991-2 are superconducting single electron transistors (SSETs). The behavior of SSETs is well defined and is discussed in detail in Joyez et al., 1994, Physical Review Letters 72, p. 11, which is hereby incorporated by reference in its entirety. See also Born et al., 2001, IEEE Trans. App. Superconductivity 11, p. 373, which is hereby incorporated by reference in its entirety.

A quantum register 800 that includes multiple qubit groups 802 has been disclosed (FIG. 8). Now, a method for entangling a qubit 610 in a first qubit group 802 with a second qubit 610 in a second qubit group 802 will be described.

In step 1000, a first qubit 610 in a first group 802 is coupled to a first resonant control system 920 for a time period $t_{1000}$. In one embodiment, first qubit 610 is coupled to the first resonant control system 920 by biasing resonant control system 920 to a frequency $\omega_{12}$ that represents the energy differential between a first potential energy level and a second potential energy level (e.g., the lowest two potential energy levels) of first qubit 610. During step 1000, first qubit group 802 is isolated from other qubit groups 802 by opening all switches 991 that connect first qubit group 802 to other qubit groups 802. The length of time $t_{1000}$ is application dependent. In some embodiments, $t_{1000}$ is one microsecond or less. In other embodiments, $t_{1000}$ is one hundred nanoseconds or less. In still other embodiments, $t_{1000}$ is ten nanoseconds or less. In any event, the length of time that first resonant control system 920 is tuned to a frequency $\omega_{12}$ is sufficiently long to entangle the quantum state of the first resonant control system 920 with the quantum state of first qubit 610.

In step 1002, a switch 991 between the first qubit group 802 and a region 990-P that adjoins a second qubit group 802 is closed. Closure of switch 991 allows first resonant control system 920 to couple to a first pivot qubit 610-p. To achieve this coupling, resonant control system 920 is biased to a frequency $\omega_{12}$ that represents the energy differential between a first potential energy level and a second potential energy level (e.g., the lowest two potential energy levels) of pivot qubit 610. This coupling is allowed to continue for a time period $t_{1002}$. The length of time $t_{1002}$ is application dependent. In some embodiments, $t_{1002}$ is one microsecond or less. In other embodiments, $t_{1002}$ is one hundred nanoseconds or less. In still other embodiments, $t_{1002}$ is ten nanoseconds or less. In any event, the length of time $t_{1002}$ is sufficient to couple the quantum state of first resonant control system 920 with the quantum state of first pivot qubit 610-p.

After time period $t_{1002}$, switch 991 is opened. During step 1002, a second switch 991 that electrically connects first pivot qubit 610-p to a second qubit group 802 is in an open state, thereby isolating the first pivot qubit 610-p from the second resonant control system 920 associated with a second qubit group 802.

In step 1004 the switch 991 (991-2) that connects region 990-P to the second group 802 is closed. This allows the first pivot qubit 610-p to couple with the second resonant control system 920 associated with the second qubit group 802. To achieve this coupling, the resonant control system 920 is biased to a frequency $\omega$ that represents the energy differential between a first potential energy level and a second potential energy level (e.g., the lowest two potential energy levels) of pivot qubit 610. This coupling is allowed to continue for a time period $t_{1004}$. The length of time $t_{1004}$ is application dependent. In some embodiments, $t_{1004}$ is one microsecond or less. In other embodiments, $t_{1004}$ is one hundred nanoseconds or less. In still other embodiments, $t_{1004}$ is ten nanoseconds or less. In any event, the length of time $t_{1004}$ is sufficient to entangle the quantum state of first pivot qubit 610-P with second resonant control system 920.

In step 1006, the second switch 991 is opened, thereby isolating second group 802 from first pivot qubit 610-P.

In step 1008, the second resonant control system 920 is coupled to a desired second qubit 610. This is accomplished by tuning the second resonant control system 920 to a frequency $\omega_{34}$ for some time period $t_{1008}$. The frequency $\omega_{34}$ represents the energy differential between a first potential energy level and a second potential energy level of the second qubit (e.g., the lowest two potential energy levels) of the desired second qubit 610. The length of time $t_{1008}$ is application dependent. In some embodiments, $t_{1008}$ is one microsecond or less. In other embodiments, $t_{1008}$ is one hundred nanoseconds or less. In still other embodiments, $t_{1008}$ is ten nanoseconds or less. In any event, the length of time that the second resonant control system 920 is tuned to a frequency $\omega_{34}$ is sufficiently long to entangle the quantum state of second resonant control system 920 with the quantum state of the desired second qubit 610.

If the second qubit 610 is not found in the second group 802, then steps 1002 through 1006 can be repeated until the desired qubit group 802 is reached. In some embodiments, resonant control system 920 includes the current-biased Josephson junction described in detail above in conjunction with FIG. 6 (i.e., system 620). In such circumstances, bias current 621-1 (FIG. 6) is adjusted to optimize entanglement between the quantum state of the qubit 610 and the lowest energy levels of the potential energy of the resonant control system. As described in detail above, a resonant control system 620 is entangled with a qubit 610 when the energy level spacing of the desired energy levels of the resonant control system 620 are tuned (adjusted) so that they correlate with (are the same as) the energy differential between the basis states (first and second ground states) of the qubit 610.

It will be appreciated that the steps 1000 through 1008 will leave resonant control system 920 in an entangled state. However, in the case where resonant control system 920 has a Josephson junction, entangled resonant control systems 920 can be unentangled by driving a current pulse that exceeds the critical Josephson current of the Josephson junction through the system. In some embodiments, the $\pi$-$\pi/2$-$\pi$ pulse sequence can be used to disentangle the resonant control circuit from the qubits. For example, an additional step 1003 includes coupling the first resonant control circuit 920 to the first qubit 610 for a duration $t_{1000}$. Step 1003 can be performed before or after the first switch 991 (991-1) has been opened. After performing step 1003, the first resonant control circuit 920 will not be entangled with the other qubits in the operation, i.e., the first qubit 610 and the first pivot qubit 610-P. Further, a step 1009 can be performed that includes coupling the second resonant control circuit to the first pivot qubit 610-P for a duration $t_{1004}$. In the present example, step 1009 must be performed with the second switch 991 (991-2) closed.

It will be further appreciated that, in a preferred embodiment, the respective energy differentials between the lowest two potential energy levels of each qubit in a given group 802 (FIG. 8) are unique. Furthermore, the energy differential between the lowest two potential energy levels of a pivot qubit should be different than the respective energy differential between the lowest two potential energy levels of each qubit in each group 802 that the pivot qubit 610 is capable of electrically communicating through a switch 991.

Yet another aspect of the present invention provides an apparatus and method for entangling the states of a first qubit and a second qubit by tuning a parallel LC-circuit (tank circuit), which is in electrical communication with the qubits, to the energy differential ΔE between the ground state of the first qubit and the ground state of the second qubit for a period of time. When tuned to energy differential ΔE, the tank circuitry is able to entangle the quantum states of the first and second qubits.

In one example in accordance with this aspect of the present invention, a first and second qubit are placed in a state where the energy difference between the respective ground state of the first and second qubits correlates with a predetermined frequency. Tank circuitry that is in electrical communication with the first and second qubit is then tuned to this predetermined frequency. When the tank circuit is tuned to this predetermined frequency, the first and second qubits become entangled. Thus, in summary, a method for coupling qubits in accordance with this aspect of the invention includes (1) tuning the ground state energy difference between the two qubits to correlate with a predetermined frequency, and (2) tuning a tank circuit to the predetermined frequency for a period of time t.

Interaction Hamiltonians

Circuitry, systems, and methods for evolving a qubit and optionally entangling multiple qubits have been described. In these circuitry and methods, it has been emphasized that there is no limitation on the type of qubits that can be used. In fact, the present invention encompasses circuits in which different types of qubits are entangled.

Generally speaking, the qubits used in the systems and methods of the present invention can be grouped into two classes: (i) qubits that are described by a native interaction Hamiltonian that includes an off diagonal interaction term (e.g., the superconducting qubit 610 of FIG. 6) and (ii) qubits that are described by a native interaction Hamiltonian that does not include an off diagonal interaction term (e.g., types of charge qubits, phase qubits, and flux qubits), but rather has a diagonal interaction term. The native interaction Hamiltonian for both classes of qubits describe the interaction between either (a) the qubit that is inductively or capacitively coupled to a bus and a resonant control system (e.g., FIG. 7) or (b) the qubit that is inductively or capacitively coupled to a resonant control system (e.g., FIG. 6).

The dynamics of qubits of the first class, qubits that are described by a native interaction Hanilltonian that includes an off diagonal interaction term (e.g., Josephson junction qubits), are considered first using system 600 as an illustration (FIG. 6). System 600 includes superconducting qubit 610 and resonant control system 620. In this case, the native interaction Hamiltonian for this system, denoted $H_{xy}$, includes an off diagonal interaction term between qubit 610 and resonant control system 620. The native interaction Hamiltonian $H_{xy}$ can be represented as:

$$H_{xy} = \frac{\varepsilon_q}{2} \cdot \sigma_x^q + \frac{\varepsilon_b}{2} \cdot \sigma_x^b + \frac{\gamma}{2} \cdot \sigma_x^q \cdot \sigma_y^b, \quad (A)$$

where q represents qubit 610, b represents control system 620, and γ is a coefficient that depends on some physical parameters of system 600. The $\sigma_x^q$ term in Equation (A) is the off-diagonal term for the qubit. It relates to the qubit dynamics, where $\sigma_x$ is represented by the matrix $$\sigma_x = \begin{bmatrix} 0 & 1 \\ 1 & 0 \end{bmatrix}.$$

Next, the dynamics of qubits of the second class, qubits that are described by a native interaction Hamiltonian that does not include an off-diagonal interaction term (e.g., charge qubits, phase qubits, flux qubits) are considered using system 600 (FIG. 6) in which superconducting qubit 610 is replaced with a charge qubit which is described in the art. See, Plastina and Falci, "Communicating Josephson Qubits", LANL, cond-mat/0206586 (Jun. 28, 2002), and the references therein, hereby incorporated by reference in their entireties. In this case, the native interaction Hamiltonian for this system, denoted $H_{xy}$, includes a diagonal interaction term between the charge qubit (which is substituted for qubit 610 in FIG. 6) and resonant control system 620. The native interaction Hamiltonian $H_{xy}$, can be represented as:

$$H_{xy} = \frac{\varepsilon_q}{2} \cdot \sigma_x^q + \frac{\varepsilon_b}{2} \cdot \sigma_x^b + \frac{\gamma}{2} \cdot \sigma_x^q \cdot \sigma_y^b, \quad (B)$$

where the entanglement term $$\frac{\gamma}{2} \cdot \sigma_x^q \cdot \sigma_y^b$$

is diagonal for the qubit. The $\sigma_z$ term is represented by the matrix $$\sigma_x = \begin{bmatrix} 1 & 0 \\ 0 & -1 \end{bmatrix},$$

which has only diagonal elements.

In the present invention, in order to utilize the qubit—qubit entanglement operation described in detail above (for the system described in FIGS. 7 and 8) the interaction term in the interaction Hamiltonian that describes an interaction between the superconducting qubit and the resonant control circuit should be off-diagonal (e.g., have the form $H_{xy}$ of Equation B). Thus, a system that includes a qubit of the first class described above, such as qubit 610, has the appropriate interaction Hamiltonian. In other words, the native interaction Hamiltonian for the first class of qubits supports maximal entanglement of a qubit coupled to a bus and resonant control system (e.g., the configuration of FIG. 7). The native interaction Hamiltonian for the first class of qubits also supports maximal entanglement between a qubit and capacitively or inductively coupled resonant control system (e.g., the configuration of FIG. 6).

The native interaction Hamiltonian of the second class of qubits does not include an off-diagonal interaction term. Accordingly, qubits of the second class, in their native state, do not support the entanglement methods described above between (a) a qubit and resonant control system capacitively or inductively coupled with the qubit or (b) a qubit that is capacitively or inductively coupled with a bus that is in turn coupled with a resonant control system. However, the present invention provides novel methods for recoupling the interaction Hamiltonian Hy for systems that include qubits of the second class described above (e.g., charge qubits). In the invention, novel methods are used to recouple the general interaction Harniltonian $H_{zy}$ for such systems in order to implement off-diagonal interactions between the qubit and the bus or resonant control system, thereby allowing for optimal entanglement of qubits of the second class.

Using the methods of the present invention, any qubit where single quantum qubit gates can be applied can be entangled with a resonant control system even in the case where the qubit is described by a native interaction Hamiltonian that includes only a diagonal interaction term (e.g., qubits of the second class). In one embodiment, this is achieved by applying a Hadamard gate, denoted H, to qubits of the second class before and after tuning a capacitively or inductively coupled resonant control system to a frequency that corresponds to the energy differential between the basis states of the qubit. Such an embodiment takes advantage of the phenomenon that the quantum computing equalities $H\sigma_x H = \sigma_z$ and $H\sigma_z H = \sigma_x$ recouples a native interaction Hamiltonian that includes a diagonal interaction term to result in an interaction Hamiltonian that includes an off-diagonal interaction term between the qubit and the bus.

Single qubit gates, such as the Hadamard gate, NOT, and CNOT, are described in references such as Makhlin et al., 2001, Rev. Mod. Phys. 73, p. 357, and the references therein, which are hereby incorporated by reference in their entireties. More specifically, single qubit gates are discussed in Appendix B of Makhlin et al. The Hadamard gate can be described in matrix form as $$H = \frac{1}{\sqrt{2}} \begin{bmatrix} 1 & 1 \\ 1 & -1 \end{bmatrix}$$

and is typically realized by a combination of the $\sigma_x$ and $\sigma_z$ single qubit operations. More specifically, application of a $\sigma_z$ qubit operation for a time $t_a$, followed by application of a $\sigma_x$ qubit operation for a time $t_b$, followed by a $\sigma_z$ qubit operation for a time $t_c$ will achieve a Hadamard gate, where $t_a$, $t_b$, and $t_c$ depend on the state of the qubit. For any type of qubit of the second class above (e.g., qubits that are described by an interaction Hamiltonian that has a diagonal interaction term, such as charge qubits, phase qubits, and flux qubits), the single qubit operations $\sigma_x$ and $\sigma_z$ depend on the specific type of qubit. For example, for the charge qubit described in Makhlin et al., the $\sigma_x$ qubit operation is realized by application of flux $\Phi$ to the qubit and the $\sigma_z$ gate is realized by controlling the charge n of the qubit. These qubit operations are applied for some duration t that correlates with the phase on the state of the charge qubit. The charge n of the qubit can be controlled by changing the gate voltage of the qubit. Thus, in one embodiment, a Hadamard gate is achieved by changing the gate voltage for a time $t_a$ to the qubit, applying a flux for a time $t_b$, and changing the gate voltage for a time $t_c$.

Application of a Hadamard gate, before and after tuning a capacitively or inductively coupled resonant control system (e.g., creating the sequence H Hy H) results in the interaction Hamiltonian:

$$H \cdot H_{zy} \cdot H = \frac{\varepsilon_q}{2} \cdot \sigma_z^q + \frac{\varepsilon_b}{2} \cdot \sigma_z^b + \gamma \cdot \sigma_x^q \cdot \sigma_y^b = H_{xy}, \quad (C)$$

where the interaction term is now off-diagonal (e.g., includes $\sigma_x$). Therefore, by application of a Hadamard gate before and after coupling a qubit, the present invention realizes universal quantum computation using several different types of qubits, including charge qubits, phase qubits, and flux qubits.

Method for Coupling a Superconducting Qubit and a Resonant Control Circuit

One aspect of the present invention provides a method for coupling a system comprising a superconducting qubit and a resonant control circuit. In this system, an interaction term of the native interaction Hamiltonian that describes an interaction between the superconducting qubit and the resonant control circuit has a diagonal component. In some embodiments, the resonant control circuit is characterized by an inductance and a capacitance. In some instances, the inductance is tunable.

In the method, a recoupling operation is applied a first time to the superconducting qubit. Next, the resonant control circuit is tuned, for an amount of time, so that the resonant frequency of the superconducting qubit and the resonant frequency of the resonant control circuit match (e.g. a plurality of quantum states of the resonant control circuit are respectively entangled with a corresponding plurality of quantum states of the superconducting qubit). In some embodiments the resonant frequency of the resonant control circuit matches the resonant frequency of the superconducting qubit when the energy differential between a first potential energy state and a second potential energy state in the superconducting qubit is the same as, or a multiple thereof of, the energy differential between a first potential energy state and a second potential energy state in the resonant control circuit. In various embodiments, the resonant control circuit and the superconducting qubit are entangled for one millisecond or less, one microsecond or less or one hundred nanoseconds or less.

In some embodiments, the tuning comprises setting an energy spacing between a first energy level and a second energy level of the resonant control circuit so that they correspond to an energy level spacing between a first energy level and a second energy level of the superconducting qubit. In some embodiments, the energy spacing of the resonant control circuit is effected by changing a bias current associated with the resonant control circuit. In some embodiments, the resonant control circuit comprises a current-biased Josephson junction and the tuning comprises changing a current across the current-biased Josephson junction. In some embodiments, such a current is changed by 1 micro-Ampere or less or 100 nanoAmperes or less.

Finally the recoupling operation is applied a second time to the superconducting qubit, thereby transforming the interaction term of the Hamiltonian to have only off-diagonal components. Such an embodiment takes advantage of the phenomenon that the quantum computing equalities $H\sigma_x H = \sigma_z$ and $H\sigma_z H = \sigma_x$ recouples a native interaction Hamiltonian that includes a diagonal interaction term to result in an interaction Hamiltonian that includes an off-diagonal interaction term between the qubit and the bus.

In some embodiments, the first and second recoupling operation each comprise application of a Hadamard gate on the superconducting qubit. In some embodiments, the Hadamard gate comprises the sequence $Z(\pi/2)-X(\pi/2)-Z(\pi/2)$, where $X(\pi/2)$ is a single qubit $\sigma_x$ operation and $Z(\pi/2)$ is a single qubit $\sigma_z$ operation, and the $\sigma_x$ operation and the $\sigma_z$ operation are each applied over a phase evolution of $\pi/2$. $X(\theta)$ and $Z(\theta)$ refer to quantum computing rotation operators, and each one represents an evolution by the parameter $\theta$ of the quantum state of the respective qubit they are applied to. The rotation operators are well known in the art. See, for example, Nielsen and Chuang, Quantum Computation and Quantum Information, Cambridge University Press, 2000, p. 17[4].

One embodiment of the present invention provides a method for coupling a qubit to a bus that is in communication with a resonant control system. The qubits in this embodiment of the invention do not have a native interaction Hamiltonian that is characterized by an all off diagonal interaction term. In the method, a first quantum gate is applied to the qubit. The qubit is then coupled with the bus. Then, a second quantum gate is applied to the qubit. In an embodiment of the present invention, the first and second quantum gate is a Hadamard gate. In this way, improved entanglement between the qubit and the resonant control system is achieved.

Entangling a state of a first qubit with a state of a second qubit using a bus Another aspect of the present invention provides a method for entangling a state of a first qubit and a state of a second qubit in a system comprising (i) the first qubit, (ii) the second qubit, and (iii) a resonant control circuit. In this system, the first qubit, the second qubit, and the resonant control circuit are each respectively coupled to a bus. Further, an interaction term of a native interaction Hamiltonian that describes an interaction between at least one of the first qubit and the second qubit with the resonant control circuit has a diagonal component.

First recoupling operation. The method in accordance with this aspect of the invention begins with the application of a recoupling operation to at least one of the first qubit and the second qubit.

First tuning operation. Next, the resonant control circuit is tuned, for a first amount of time, so that a resonant frequency of the first qubit and a resonant frequency of the resonant control circuit match. The resonant frequency of the first qubit and the resonant frequency of the resonant control circuit match when, during this first amount of time, a plurality of quantum states of the first qubit is respectively entangled with a corresponding plurality of quantum states of the resonant control circuit.

Second tuning operation. The resonant control circuit is then tuned, for a second amount of time, so that a resonant frequency of the second qubit and a resonant frequency of the resonant control circuit match. The resonant frequency of the second qubit and the resonant frequency of the resonant control circuit match when a plurality of quantum states of the second qubit is respectively entangled with a corresponding plurality of quantum states of the resonant control circuit during the second amount of time.

Second recoupling operation. Finally, the recoupling operation is reapplied to the at least one of the first qubit and the second qubit. The two recoupling operation steps transform the interaction term between the respective qubit and bus so that it has only off-diagonal components. In some embodiments, the method has the additional step of tuning, for a third amount of time, the resonant control circuit so that a resonant frequency of the first qubit and a resonant frequency of the resonant control circuit match. If the first qubit was involved with the recoupling operation, then this embodiment can be performed before the second recoupling operation is applied to the first qubit.

In some embodiments in accordance with this aspect of the invention, the first qubit is capacitively coupled to the bus and the second qubit is capacitively coupled to the bus. In some embodiments, the resonant control circuit is in electrical communication with the bus. In some embodiments, the recoupling operation comprises implementing a Hadamard gate on the at least one of the first qubit and the second qubit. In some instances, the Hadamard gate comprises the sequence $Z(\pi/2)-X(\pi/2)-Z(\pi/2)$, wherein $X(\pi/2)$ is a single qubit $\sigma_x$ operation and $Z(\pi/2)$ is a single qubit $\sigma_z$ operation, and each $\sigma_x$ operation is applied over a phase evolution of $\pi/2$ and the $\sigma_z$ operation is applied over a phase evolution of $\pi/2$.

In some embodiments in accordance with this aspect of the invention, the first tuning step comprises setting a first energy spacing between a first energy level and a second energy level of the resonant control circuit so that they are approximately equal to a second energy spacing between a first energy level and a second energy level of the first qubit. In some instance, this is accomplished by changing a bias current associated with the resonant control circuit.

In some embodiments in accordance with this aspect of the invention, the second tuning step comprises setting the first energy spacing so that it is approximately equal to a third energy spacing between a first energy level and a second energy level of the second qubit. In some instances, this is accomplished by changing a bias current associated with the resonant control circuit.

In some embodiments, the resonant control circuit is characterized by an inductance and a capacitance. In some instances, the inductance is tunable. In some embodiments, the resonant control circuit comprises a current-biased Josephson junction and the first tuning and the second tuning comprises changing a current bias across the current-biased Josephson junction. Very little change in the current-bias is required. For example, in some embodiments, the current-biased Josephson junction is changed by 1 micro-Ampere or less during the first or second tuning. In another example, the current-biased Josephson junction is changed by 100 nano-Amperes or less during the first or second tuning.

CONCLUSION

While the present invention has been described with reference to a few specific embodiments, the description is illustrative of the invention and is not to be construed as limiting the invention. Various modifications can occur to those skilled in the art without departing from the true spirit and scope of the invention as defined by the appended claims.

All references cited herein are incorporated herein by reference in their entirety and for all purposes to the sane extent as if each individual publication or patent or patent application was specifically and individually indicated to be incorporated by reference in its entirety for all purposes.

What is claimed is:

1. A method for entangling a quantum state of a first qubit with a quantum state of a resonant control system, the method comprising:

tuning a resonant control system, which is capacitively or inductively coupled to said first qubit, to a resonant frequency for a period of time, wherein said resonant frequency corresponds to an energy difference between a first energy level and a second energy level of said first qubit, thereby entangling the quantum state of said first qubit with the quantum state of said resonant control system.

2. The method of claim 1, wherein said resonant control system is an anharmonic resonator.

3. The method of claim 1, wherein said resonant control system is superconducting.

4. The method of claim 1, wherein said resonant control system comprises a Josephson junction and a bias current source that is connected in series with said Josephson junction, and wherein said tuning comprises altering the magnitude of said bias current source.

5. The method of claim 4, wherein the magnitude of said bias current source is 0.994*Ic or less during said tuning, wherein Ic is the critical current of said Josephson junction.

6. The method of claim 4, wherein the magnitude of said bias current source is 0.990*Ic or less during said tuning, wherein Ic is the critical current of said Josephson junction.

7. The method of claim 1, wherein said period of time is one microsecond or less.

8. The method of claim 1, wherein said period of time is one hundred nanoseconds or less.

9. The method of claim 1, wherein said period of time is long enough for said quantum state of said resonant control system to entangle with said quantum state of said first qubit.

10. The method of claim 1, the method further comprising: applying a first quantum gate to said first qubit prior to said tuning; and applying a second quantum gate to said first qubit after said tuning.

11. The method of claim 10, wherein said first quantum gate is a Hadamard gate and said second quantum gate is a Hadamard gate.

12. The method of claim 1, wherein said coupling of said first qubit to said resonant control system is described by a native interaction Hamiltonian that includes an off diagonal interaction term.

13. The method of claim 1, wherein said first qubit is a superconducting charge qubit or a superconducting phase qubit.

14. The method of claim 1, wherein the resonant control system is capacitively or inductively coupled to a plurality of qubits, wherein the plurality of qubit includes said first qubit.

15. The method of claim 1, wherein the first qubit is a superconducting qubit.

16. The method of claim 1, wherein the first qubit is described by a native interaction Hamiltonian that includes a diagonal interaction term.

* * * * *